(12) United States Patent
Feeney et al.

(10) Patent No.: US 8,063,119 B2
(45) Date of Patent: *Nov. 22, 2011

(54) BARRIER COATING OF A NON-ELASTOMERIC POLYMER AND A DISPERSED LAYERED FILLER IN A LIQUID CARRIER AND COATED ARTICLES

(75) Inventors: Carrie A. Feeney, Bridgewater, NJ (US); Harris A. Goldberg, Edison, NJ (US); Michele Farrell, Bethlehem, PA (US); Douglas P. Karim, Green Brook, NJ (US); Keisha R. Oree, Montclair, NJ (US)

(73) Assignee: InMat Inc., Hillsborough, NJ (US)

( * ) Notice: Subject to any disclaimer, the term of this patent is extended or adjusted under 35 U.S.C. 154(b) by 1809 days.

This patent is subject to a terminal disclaimer.

(21) Appl. No.: 10/741,741

(22) Filed: Dec. 19, 2003

(65) Prior Publication Data

US 2007/0213446 A1 Sep. 13, 2007

Related U.S. Application Data

(60) Provisional application No. 60/498,799, filed on Aug. 29, 2003.

(51) Int. Cl.
*C08K 9/00* (2006.01)
*C08K 3/34* (2006.01)
(52) U.S. Cl. ......... 523/216; 523/200; 524/445; 524/446
(58) Field of Classification Search .................. 524/445, 524/446; 523/333, 200, 216
See application file for complete search history.

(56) References Cited

U.S. PATENT DOCUMENTS

| 491,618 | A | 1/1885 | Kuwajima et al. ............. 428/241 |
| 4,344,859 | A | 8/1982 | Burke, Jr. .................. 252/359 D |
| 4,425,465 | A | 1/1984 | Padget et al. ................. 524/450 |
| 4,472,538 | A | 9/1984 | Kamigaito et al. ........... 523/202 |
| 4,505,755 | A | 3/1985 | Shinozuka et al. ........ 106/308 B |
| 4,515,633 | A * | 5/1985 | Cruz, Jr. ..................... 106/18.26 |
| 4,528,235 | A | 7/1985 | Sacks et al. ................... 428/220 |
| 4,536,425 | A | 8/1985 | Hekal ............................ 428/35 |
| 4,857,397 | A | 8/1989 | Mowdood et al. ........... 428/323 |
| 4,889,885 | A | 12/1989 | Usuki et al. .................. 524/445 |
| 4,911,218 | A | 3/1990 | Patitsas ......................... 152/525 |
| 4,960,639 | A | 10/1990 | Oda et al. .................... 428/34.5 |
| 4,983,432 | A | 1/1991 | Bissot .......................... 428/35.7 |
| 5,049,609 | A | 9/1991 | Patitsas ......................... 524/386 |
| 5,091,467 | A | 2/1992 | Beers ............................ 525/57 |
| 5,178,702 | A | 1/1993 | Frerking, Jr. et al. ......... 152/510 |
| 5,356,989 | A * | 10/1994 | Tachika et al. ................ 524/608 |
| 5,576,372 | A | 11/1996 | Kresge et al. ................. 524/442 |
| 5,576,373 | A | 11/1996 | Kresge et al. ................. 524/445 |
| 5,595,750 | A | 1/1997 | Jacobson et al. .............. 424/421 |
| 5,665,183 | A | 9/1997 | Kresge et al. ................. 152/204 |
| 5,665,810 | A | 9/1997 | Patchett et al. ................ 524/449 |
| 5,854,326 | A | 12/1998 | Sakaya et al. ................. 524/445 |
| 5,883,173 | A | 3/1999 | Elspass et al. ................ 524/446 |
| 5,942,298 | A | 8/1999 | Sakaya et al. ................. 428/36.6 |
| 6,087,016 | A | 7/2000 | Feeney et al. ................. 428/454 |
| 6,107,387 | A | 8/2000 | Kaylo et al. .................. 524/446 |
| 6,162,857 | A | 12/2000 | Trexler, Jr. et al. ........... 524/445 |
| 6,232,389 | B1 | 5/2001 | Feeney et al. ................. 524/450 |
| 6,759,463 | B2 | 7/2004 | Lorah et al. ................... 524/445 |
| 6,838,507 | B2 | 1/2005 | Chou et al. .................... 524/445 |
| 2002/0032272 | A1 | 3/2002 | Sievers et al. ................. 524/501 |
| 2002/0058740 | A1 | 5/2002 | Lorah et al. ................... 524/445 |
| 2005/0059769 | A1 | 3/2005 | Chou et al. .................... 524/445 |
| 2005/0228104 | A1 * | 10/2005 | Feeney et al. ................. 524/445 |

FOREIGN PATENT DOCUMENTS

| CA | 993738 | 7/1976 | .................. 117/237 |
| EP | 0 125 815 A2 | 11/1984 | |
| EP | 0 569 646 A1 | 11/1993 | |
| EP | 0 601 877 A1 | 6/1994 | |
| EP | 0 747 323 A1 | 12/1996 | |
| GB | 2 134 094 A | 8/1984 | |
| JP | 63189446 A * | 8/1988 | |
| JP | 11246729 | 9/1999 | |
| WO | WO 93/04118 | 3/1993 | |
| WO | WO 97/00910 | 1/1997 | |
| WO | WO 98/56861 | 12/1998 | |
| WO | WO 00/49072 | 8/2000 | |
| WO | WO 2004/022635 A1 | 3/2004 | |
| WO | WO 2004/065474 A1 | 8/2004 | |
| WO | WO 2005/044938 | 5/2005 | |

OTHER PUBLICATIONS

E. L. Cussler et al., J. Membrane Sci. 38:161-174 (1988).
Chang, J. et al., Journal of Applied Polymer Science, vol. 84, 2294 (2002).
Yano, K. et al., Journal of Polymer Science A: Polymer Chemistry, 35, 2289, (1997).
Lan, T. et al., Chem. Mater. 6, 573 (1994).
Messersmith, P.B. and Giannelis, E.P., Journal of Polymer Sicence A: Polymer Chemistry 33, 1047.
L.E. Nielsen, Journal of Macromolecular Science, Chemistry A1,929.(1967).
R.K. Bharadwaj, "Modeling the Barrier Properties of Polymer-Layered Silicate Nanocomposites", Macromolecules 34, 9189 (2001).
G.H. Fredrickson and J. Bicerano, "Barrier properties of oriented disk composites", Journal of Chemical Physics 110, 2181 (1999).
W.J. Ward et al., "Gas Barrier Improvement Using Vermiculite and Mica in Polymer Films", Journal of Membrane Science, 55:173-180 (1991).

(Continued)

*Primary Examiner* — Vickey Nerangis
(74) *Attorney, Agent, or Firm* — Michael W. Ferrell

(57) ABSTRACT

Barrier coating mixtures contain in a carrier liquid, (a) a non-elastomeric polymer; (b) an exfoliated layered platelet-like silicate filler which may or may not have been acid or base treated that has not been functionalized with organic cations having an aspect ratio greater than 25; and (c) at least one additive, wherein the total solids content is less than 30% and the amount of filler is between 5% to about 60% of the total solids content. Coated articles and containers, freestanding films and packaging films are produced using the barrier coating mixtures. Methods of manufacturing such coated products are also encompassed.

40 Claims, No Drawings

OTHER PUBLICATIONS

Lee, D.C. and Jang, L.W., Journal of Applied Polymer Science, vol. 61, 1117-1122 (1996).

Wu, Y-P et al., "Structure of Carboxylated Acrylonitrile-Butadiene Rubber (CNBR)-Filler Nanocomposites by Co-coagulating Rubber Latex and Filler Aqueous Suspension", Journal of Applied Polymer Science 82, 2842-2848 (2001).

Wu, Y-P et al., "Structure and Properties of Nitrile Rubber (NBR)-Filler Nanocomposites by Co-coagulating NBR Latex and Filler Aqueous Suspension", Journal of Applied Polymer Science, 89, 3855-3858 (2003).

Varghese and Karger-Kocsis, "Natural rubber-based nanocomposites by latex compounding with layered silicates", Polymer, 1-8 (2003).

Goldberg et al., "Nanocomposite Barrier Coatings for Elastomeric Applications", Materials Research Society, Symposium T: Polymer nanocomposites, paper T4.7, (Apr. 2002).

Goldberg et al., "Elastomeric Barrier Coatings for Sporting Goods", ACS Rubber Section, Apr. 29, 2002, paper 17, published in Rubber World, vol. 226, No. 5, p. 15 (Aug. 2002).

Oriakhi and Lerner "Poly(Pyrrole) and Poly(Thiophene)/Filler Nanocomposites via Latex-Colloid Interaction", Materials Research Bulletin, 30, 723-729(1995).

van Amerongen, G.J., "Diffusion in Elastomers", Rubber Chem Tech, 37, pp. 1065-1152 (1964).

The Vanderbilt Latex Handbook, 3rd edition, R.T. Vanderbilt Company, Inc., pp. 112-115.

* cited by examiner

BARRIER COATING OF A NON-ELASTOMERIC POLYMER AND A DISPERSED LAYERED FILLER IN A LIQUID CARRIER AND COATED ARTICLES

CLAIM FOR PRIORITY

This non-provisional application claims the benefit of the filing date of U.S. Provisional Patent Application Ser. No. 60/498,799, filed Aug. 29, 2003.

FIELD OF INVENTION

The present invention relates to novel barrier coating compositions, and particularly to coatings, which have an enhanced reduction in gas permeability.

BACKGROUND OF INVENTION

Barrier coatings (layers) which prevent, reduce, or inhibit the permeation of a selected substrate with a gas, vapor, chemical and/or aroma have been widely described, and such coatings are used in a variety of industries, e.g., the packaging industries, automobile industries, paint industries, tire industries etc. Typical barrier materials used in coatings include polyesters, PVDC, polyurethanes, acrylic polymers, etc.

It is well known that the barrier properties of a polymer can be improved by the addition of impermeable plate like structures. When the plates are oriented perpendicular to the diffusion (permeation) direction, the diffusing molecules must go around the plates. This leads to significant reductions in the permeability of the polymer. See, for example, E. L. Cussler et al., *J. Membrane Sci.* 38:161-174 (1988); W. J. Ward et al., *J. Membrane Sci.*, 55:173-180 (1991); Chang, J. et al., *Journal of Applied Polymer Science*, Vol. 84, 2294 (2002); Yano, K. et al., *Journal of Polymer Science A: Polymer Chemistry*, 35, 2289 (1997); Lan, T. et al., *Chem. Mater.* 6, 573 (1994); Messersmith, P. B. and Giannelis, E. P, *Journal of Polymer Science A: Polymer Chemistry* 33,1047 (1995); U.S. Pat. Nos. 4,528,235; 4,536,425; 4,911,218; 4,960,639; 4,983,432; 5,091,467; and 5,049,609; and International Patent Application No. WO93/04118, published Mar. 4, 1993, among others.

Control of permeation using relatively low aspect ratio platelets, at low concentrations, and thermoplastically processed at high shear rates has been previously disclosed. See, for example, E. L. Cussler et al., *J. Membrane Sci.* 38:161-174 (1988); L. E. Nielsen, *Journal of Macromolecular Science, Chemistry* A1,929, (1967); R. K. Bharadwaj, "Modeling the Barrier Properties of Polymer-Layered Silicate Nanocomposites", *Macromolecules* 34, 9189 (2001); G. H. Fredrickson and J. Bicerano, "Barrier properties of oriented disk composites", *Journal of Chemical Physics* 110, 2181 (1999). These conditions lead to relatively small improvements in the barrier properties of the polymer. This is because the reduction in permeability varies rapidly with the aspect ratio and the concentration of plates when the plates are well aligned. If the plates are not well aligned, the reductions in permeability are further reduced. The targeted application of these earlier efforts was not coatings, but a bulk polymer with improved barrier and/or mechanical properties.

Use of platelet fillers in coating formulations is also well known. Most often, they have been used in paints to modify the rheology, enabling the production of no-drip paints. These platelet fillers are typically montmorillonites or other exfoliated silicates with aspect ratio of 50 or less. They form a house of cards type structure in the coating suspension that gives a gel like property to the paint (or coating) when it is not undergoing any shear. These structures do not have the optimally aligned plates to significantly reduce the permeability of the coating.

Use of exfoliated silicates that can produce nanocomposite barrier coatings has been achieved by several methods. The most widely used has been by combining a dissolved polymer with exfoliated filler. Water-soluble polymers such as polyvinyl alcohol (PVOH) have been combined with water exfoliated filler such as vermiculite. See, for example, Japan patent 11-246729, Sep. 14, 1999, "Gas-Barrier Poly(vinyl alcohol)/poly (acrylic acid) Compositions and their Laminates and Shaped Articles". Sumitomo Chemical Co., Ltd. Polycarbonate dissolved in toluene has been combined with organically functionalized filler to form good barrier coatings. See, for example, W. J. Ward et al., "Gas Barrier Improvement Using Vermiculite and Mica in Polymer Films", *Journal of Membrane Science*, 55:173-180 (1991). Other polymers have also been made into improved barrier coatings by dissolving them in a solvent, and using an organically functionalized filler to improve the barrier properties. See, for example, Yano, K., et al., "Synthesis and properties of polyimide-filler hybrid composites", *Journal of Polymer Science A: Polymer Chemistry*, 35, 2289 (1997).

An alternative method that has been used to form nanocomposites has been to incorporate the exfoliated filler into the monomer before polymerization. See, for example, U.S. Pat. No. 4,472,538 "Composite Material Composed of Filler Mineral and Organic High Polymer and Method for Producing the Same", Sep. 18, 1984; U.S. Pat. No. 4,889,885 "Composite Material Containing a Layered Silicate", Dec. 26, 1989. In some cases, this has been done in aqueous dispersion. Several monomers that can be polymerized into elastomers had exfoliated clay incorporated into the monomer droplets before the emulsion polymerization as described in PCT Patent No. WO 97/00910, Jan. 9, 1997, "Polymer nanocomposite Formation by emulsion Synthesis", Exxon Research and Engineering Co. Methacrylate monomer was combined with exfoliated filler in aqueous dispersion prior to its polymerization into a nanocomposite. See, for example, Lee, D. C. and Jang, L. W., *Journal of Applied Polymer Science*, Vol. 61, 1117-1122 (1996). None of these methods led to practical coating formulations. They were designed to help make bulk nanocomposites for thermal processing.

There are several examples of using an aqueous dispersion of exfoliated filler with an aqueous dispersion of polymer to form a nanocomposite. Most of that work used elastomeric polymers in suspension. See, for example, Wu, Y-P et al, "Structure of Carboxylated Acrylonitrile-Butadiene Rubber (CNBR)-Filler Nanocomposites by Co-coagulating Rubber Latex and Filler Aqueous Suspension", *Journal of Applied Polymer Science*, 82, 2842-2848 (2001); Wu, Y-P et al., "Structure and Properties of Nitrile Rubber (NBR)-Filler Nanocomposites by Co-coagulating NBR Latex and Filler Aqueous Suspension", *Journal of Applied Polymer Science*, 89, 3855-3858 (2003); Varghese and Karger-Kocsis, "Natural rubber-based nanocomposites by latex compounding with layered silicates", *Polymer* (in press) (2003); Feeney et al., U.S. Pat. No. 6,087,016, "Barrier Coating of an Elastomer and a Dispersed Layered Filler in a Liquid Carrier", Jul. 11, 2000; Feeney et al., U.S. Pat. No. 6,232,389, "Barrier Coating of an Elastomer and a Dispersed Layered Filler in a Liquid Carrier and Coated Articles", May 15, 2001; Goldberg et al., "Nanocomposite Barrier Coatings for Elastomeric Applications", *Materials Research Society, Symposium T*: Polymer nanocomposites, paper T4.7, (April 2002); and Goldberg et al., "Elastomeric Barrier Coatings for Sporting Goods", ACS Rubber Section, Apr. 29, 2002, paper 17, published in *Rubber World*, vol. 226, No. 5, p 15 (August 2002). The typical use of ion exchange to make the filler surface more compatible with the polymer is not used in these references, in that usually makes the filler fall out of aqueous suspension. In order to form a nanocomposite from a combination of polymer spheres and filler platelets, one needs significant flow and deformation of the polymer. Thus it was not expected that this approach would work with more rigid, non-elastomeric polymers.

The only example found that tried this approach in a non-elastomeric polymer is described in Oriakhi and Lerner ["Poly(Pyrrole) and Poly(Thiophene)/Filler Nanocomposites via Latex-Colloid Interaction", *Materials Research Bulletin*, 30, 723-729(1995)]. Their method involved forming separate aqueous polymer latex and aqueous exfoliated clay suspensions. The latex was washed repeatedly before combining with the exfoliated clay in order to remove stabilizers and surfactants. Mixing the suspensions did not lead to stable coating suspensions, but rather coagulating mixtures where the nanocomposite came out of suspension. These mixtures of clay and polymer dispersed in water could not be used as a coating formulation and are therefore very different from the invention described in this patent.

The approach used by us and described in this patent differs from the above art in that it leads to stable coating formulations that can be applied to a range of articles in order to form a nanocomposite coating. The nanocomposite forms during the drying process which is well below the melt temperature of the polymer. Thus it is clear that the polymer particles undergo significant deformation during drying.

SUMMARY OF THE INVENTION

Advantageously, the present invention solves the problems of the prior art by providing a coating composition, which contains substantially dispersed exfoliated layered silicate filler which may or may not have been acid or base treated and a water dispersed non-elastomeric polymer. This coating, when dried, results in a barrier with large reductions in permeability relative to the unfilled polymer.

In one embodiment this invention provides a barrier coating derived from an aqueous dispersion of a non-elastomeric polymer, a substantially exfoliated silicate filler material not functionalized with organic cations, the silicate filler having an aspect ratio greater than 25, wherein % of the silicate filler is less than 60% of the solid content, and at least one additive, selected from the group consisting of surfactants, emulsifiers, anti-foaming agents, dispersing agents, wetting agents, leveling agents and thickeners wherein the coating exhibits an at least 5-fold reduction in gas permeability than a coating formed of the non-elastomeric polymer alone.

The barrier coating further exhibits at least 25-fold, 50-fold, 100-fold, 500-fold and 1000-fold reductions in gas permeability as compared with a coating formed of the non-elastomeric polymer alone.

The dispersion is in a form selected from the group consisting of a dispersion, an emulsion, a suspension and a latex.

The non-elastomeric polymer is selected from polyvinylidene chloride and its copolymers and blends, polyester containing polymers, and polyesters, preferably where the polyester has a $T_g$ lower than 70° C., preferably lower than 35° C.

The silicate filler is selected from the group consisting of bentonite, vermiculite, montmorillonite, nontronite, beidellite, volkonskoite, hectorite, saponite, laponite, sauconite, magadiite, kenyaite, ledikite and mixtures and solutions of the above silicates. The silicate filler is preferably vermiculite and is present at less than 60% of the total solids, preferably at between about 10 to about 50%.

The silicate filler can be treated with acid or base prior to mixing with said non-elastomeric polymer. The acid is chosen from acetic acid, glycine and citric acid and the base is selected from ammonium hydroxide, sodium hydroxide and potassium hydroxide.

The dispersion has total solids content of from about 1 to about 30%, preferably from about 5 to about 25%.

In a further aspect the invention provides a method to produce a barrier coating film comprising applying to a substrate an aqueous dispersion containing a non-elastomeric polymer, a substantially exfoliated silicate filler material not functionalized with organic cations, the silicate filler having an aspect ratio greater than 25, wherein % of the silicate is less than 60% of the solid content, and at least one additive, selected from the group consisting of surfactants, emulsifiers, anti-foaming agents, dispersing agents, wetting agents, leveling agents and thickeners and drying the dispersion to a barrier coating having the same polymer to filler ratio as in the dispersion wherein the coating exhibits an at least 5-fold reduction in gas permeability than a coating formed of the non-elastomeric polymer alone.

The barrier coating further exhibits at least 25-fold, 50-fold, 100-fold, 500-fold and 1000-fold reductions in gas permeability as compared with a coating formed of the non-elastomeric polymer alone.

The dispersion is in a form selected from the group consisting of a dispersion, an emulsion, a suspension and a latex.

The non-elastomeric polymer is selected from polyvinylidene chloride and its copolymers and blends, polyester containing polymers, and polyesters, preferably where the polyester has a $T_g$ lower than 70° C., preferably lower than 35° C.

The silicate filler is selected from the group consisting of bentonite, vermiculite, montmorillonite, nontronite, beidellite, volkonskoite, hectorite, saponite, laponite, sauconite, magadiite, kenyaite, ledikite and mixtures and solutions of the above silicates. The silicate filler is preferably vermiculite and is present at less than 60% of the total solids, preferably at between about 10 to about 50%.

The silicate filler can be treated with acid or base prior to mixing with said non-elastomeric polymer. The acid is chosen from acetic acid, glycine and citric acid and the base is selected from ammonium hydroxide, sodium hydroxide and potassium hydroxide.

The dispersion has a total solids content of from about 1 to about 30%, preferably from about 5 to about 25%.

The substrate is selected from the group consisting of antiseptic packaging films, corrosion protective films, vacuum and controlled atmosphere packages, blow molded containers, thermoformed containers and electronic display films.

The present invention, in part, is based on the discovery that large (>5 fold) improvements in permeation properties can be obtained for barrier coatings including non-elastomeric polymers. These polymers typically have lower permeability than elastomers, and are often used in packaging applications for that reason. They are also stiffer than elastomeric polymers. The use of an exfoliated filler nanocomposite approach to improving the barrier properties of many of these materials has been attempted through the use of organic functionalization of the filler, and then subsequent thermal or solvent processing as described above. It is the purpose of this invention to describe coating formulations and methods of making nanocomposite coatings that does not involve the organic functionalization of the exfoliated filler, does not involve dissolving the polymer in a solvent, and leads to nanocomposite coatings with superior barrier properties with larger filler concentrations, aspect ratios, and better orientation than has been achieved by other methods.

Other aspects and advantages of the present invention are described in the detailed description below and in the claims.

DETAILED DESCRIPTION OF THE INVENTION

The present invention is unique in that it provides for coating formulations and subsequently formed coatings and films that achieve large reductions in permeability by mixing aqueous dispersed exfoliated silicates (that have not been organically functionalized) with aqueous dispersed polymers. The utility of the subsequent films, coatings, and coated articles, which are also provided by the invention, can provide improved barrier materials in packaging and electronic applications.

The results obtained with non-elastomeric polymers (the subject of this invention) are surprising even when viewed relative to the elastomeric nanocomposite formulations of U.S. Pat. No. 6,087,016, "Barrier Coating of an Elastomer and a Dispersed Layered Filler in a Liquid Carrier" Jul. 11, 2000 to Feeney, et al. This is because aqueous dispersions of non-elastomeric polymers usually retain their spherical morphology through the process of forming a film from the aqueous dispersion. This means that one would expect it to be very difficult to get good dispersion of the exfoliated filler in the final coating, and one skilled in the art would expect that the filler would coalesce at the interfaces between the polymer particles during film formation. The large reductions in barrier properties that have been achieved indicate that this coalescence did not occur to a large enough extent to limit the reduction in permeability.

An embodiment of this invention provides for a barrier coating that comprises an aqueous dispersion of a non-elastomeric polymer, a substantially exfoliated silicate filler material not functionalized with organic cations, the silicate having an aspect ratio greater than 25 and the silicate is present at less than 60% of the total solids content, and at least one additive, selected from the group consisting of surfactants, emulsifiers, anti-foaming agents, dispersing agents, wetting agents, leveling agents and thickeners wherein the total solids content is less than 30% of the dispersion and the dispersion provides a coating with an at least 5-fold greater reduction in gas permeability than a coating formed of the elastomeric polymers alone. The barrier coating can be in the form of a dispersion, an emulsion, a suspension and a latex.

The non-elastomeric polymer is selected from polyvinylidene chloride and its copolymers and blends, polyester containing polymers, and polyesters, preferably where the polyester has a $T_g$ lower than 70° C., preferably lower than 35° C.

The preferred silicate filler is vermiculite, which may be treated with either acid or base prior to mixing with the polymer mixture. The preferred acids are selected from acetic acid, glycine and citric acid and the preferred bases are selected from ammonium hydroxide, sodium hydroxide and potassium hydroxide.

The preferred barrier coating has total solids content of from about 5% to about 25% and the dispersed silicate filler is present at between 10 to about 50% by weight of the total solids content.

In a further embodiment, the invention provides a method of producing a barrier coating film that comprises applying to a substrate an aqueous dispersion containing a non-elastomeric polymer, a substantially exfoliated silicate filler material not functionalized with organic cations, the silicate having an aspect ratio greater than 25 and the silicate is present at less than 60% of the total solids content, and at least one additive, selected from the group consisting of surfactants, emulsifiers, anti-foaming agents, dispersing agents, wetting agents, leveling agents and thickeners.

The dispersion is allowed to dry to a barrier coating having the same polymer to filler ratio as in the aqueous dispersion wherein the total solids content is less than 30% of the dispersion and wherein the dispersion provides a coating with an at least 5-fold greater reduction in gas permeability than a coating formed of said elastomeric polymer alone.

The non-elastomeric polymer is selected from polyvinylidene chloride and its copolymers and blends, polyester containing polymers, and polyesters, preferably where the polyester has a $T_g$ lower than 70° C., preferably lower than 35° C.

The preferred silicate filler is vermiculite, which may be treated with either acid or base prior to mixing with the polymer mixture. The preferred acids are selected from acetic acid, glycine and citric acid and the preferred bases are selected from ammonium hydroxide, sodium hydroxide and potassium hydroxide.

The preferred barrier coating has total solids content of from about 5% to about 25% and the dispersed silicate filler is present at between 10 to about 50% by weight of the total solids content.

The preferred substrates are selected from the group consisting of antiseptic packaging films, corrosion-protective films, vacuum and controlled atmosphere packages, blow molded containers, thermoformed containers and articles and electronic displays.

I. Definitions

The term "aspect ratio" is defined as a characteristic of every platelet material in solid form. Aspect ratio is the product of the lateral dimension of a platelet filler particle, e.g., mica flake, divided by the thickness of the platelet. "High aspect ratio" refers to a platelet filler whose lateral dimension divided by thickness is greater than 25. The aspect ratio of any filler is an inherent property of the selected filler. For example, MICROLITE® 963 aqueous vermiculite solution [W. R. Grace, See EP Application No. 601,877, published Jun. 15, 1994] has a characteristic aspect ratio of about 10,000 or dimensions of 10-30 μm×10 Å.

A "barrier coating mixture" includes a liquid containing suspended solids, which is used to apply the solids to a substrate. A novel aspect of the present invention is that the barrier coating mixtures provide a better dispersion of platelet fillers in liquid at an unusually low solids content, e.g., between about 1 to about 30% solids as described in more detail below. According to this invention, once the "coating mixture" is dried, it is referred to as a "dried coating" or a "film".

"Exfoliation" is defined for layered fillers as the complete separation of individual layers of the original particle, so that the polymer completely surrounds each particle. Desirably a sufficient amount of polymer is present between each platelet, that the platelets are randomly spaced. No X-ray line appears because of the random spacing of exfoliated platelets. In some circumstances, the filler can exfoliate when dispersed in an aqueous or non-aqueous medium. This would result in a higher aspect ratio than that of a solid particle before dispersion.

The term "gas barrier" includes a barrier to oxygen, nitrogen, carbon dioxide and other gases.

"Mesoscopic domains" means that the plates form locally oriented domains where the platelets are well aligned. Macroscopic domains can be seen when suspensions of particles forming Mesoscopic domains are viewed through cross polarizers. These domains become difficult to see when polymer is dispersed in the water.

The term "mixture" or "coating mixture" is interpreted to include a colloidal dispersion, suspension, emulsion and latex as they are conventionally defined. For example, by "colloidal dispersion or latex" is meant any dispersion or suspension of particles in liquid, the particles being of a size greater than molecular scale, e.g., about 0.001 to about 0.1 micron. An emulsion generally contains particles of about 0.05 to 1.0 microns, in liquid. A "suspension" generally contains particles of greater than 1.0 micron in liquid.

The term "nanocomposite" or "filled polymer nanocomposite" refers to the mixture of substantially exfoliated filler and polymer. The degree of exfoliation of the filler in the polymer is not specified. The thickness of at least some filler particles is below 1 micron, and probably well below 100 nm.

As used herein, "non-elastomeric polymer" includes those polymeric materials with glass transition temperatures ($T_g$) above room temperature and/or with crystallinity above 10%. Typically, non-elastomeric polymers can be viewed as polymers that even when properly crosslinked and not filled with inorganic fillers cannot be stretched at room temperature to twice their length and then return to their original shape. This definition refers to the properties of the polymer, and not to the filled or final nanocomposite coating.

The term "substrate" or "article" coated by these coatings includes, without limitation, materials such as films, particularly packaging films (including antiseptic, corrosion protective, vacuum and controlled atmosphere packages), blow molded or thermoformed containers and articles, electronic displays and other surfaces, and the like.

II. The Barrier Coating

A barrier coating according to this invention includes the following components:
(a) a water dispersed non-elastomeric polymer;
(b) a dispersed, exfoliated layered platelet silicate filler that may have been pretreated with acid or base having an aspect ratio greater than 25; and
(c) at least one additive, selected from the group consisting of surfactants, emulsifiers, anti-foaming agents, dispersing agents, leveling agents and thickeners
wherein the total solids content is desirably equal to or below 30% solids and the amount of treated filler is present up to 5-60% of the total solids. These barrier coating mixtures result in films with reductions in permeability of 5 times to as high as 1500 times or even higher relative to the unfilled polymer. These results are substantially higher than the prior art on other platelet filled barrier coatings.

The coating formulations and subsequent nanocomposite barrier coatings that are formed from them are unique in the following respects:
1. The dispersed polymer used is not elastomeric—(surprising that the dispersed polymer particles can deform to form the nanocomposite barrier film);
2. The exfoliated filler has not been organically functionalized (which is typically done using an ion exchange process with organic cations);
3. The concentration and aspect ratio of the exfoliated filler in dispersion is chosen so that it forms mesoscopic domains. This facilitates the orientation of the platelets in the final nanocomposite coating, leading in part to the large improvements in barrier properties;
4. The concentration of filler can be high (up to 60% relative to the total weight) also leading to large reductions in permeability.

The barrier coating mixtures of this invention are characterized by a balancing of several critical features, i.e., appropriate dispersion of the filler in the non-elastomeric polymer, orientation of the filler platelets in the non-elastomeric polymer, as well as high aspect ratio of the filler, in order to achieve the desired permeability reductions in the dried barrier coating. The barrier coating mixtures of this invention desirably contain an unusually low total solids content, i.e., between about 1% and about 30% solids. A more desirable range of solids content is between about 5% to about 25% solids. The solids content is an important consideration in the barrier coatings compositions and performance of the dried coatings because the solids content effects the dispersion of the high aspect ratio filler. If high total solids content is used in the barrier coating composition, one would not achieve well dispersed filler, e.g., vermiculite, and the permeability reductions characteristic of the coatings of this invention, and reported in the examples and figures herein, are not achieved. The preferred range of solid content is unexpectedly well below that typically used in the coating industry and therefore not predicted by the prior art teachings concerning barrier coatings formulations.

The total solids content of the coating mixtures of this invention is preferably less than 30% with the silicate filler comprising 5-60% of the total, particularly when the polymer is a non-elastomeric polymer such as PVDC and its copolymers and blends or a polyester as defined below, and the filler is a vermiculite suspension. Examples 3-9 and 12-20 indicate a variety of desirable compositions of this invention.

Preferably, in the dried barrier coating (film), the polymer is present at between about 65 to about 95% by weight and the dispersed layered filler is present at between about 5 to about 35% by weight.

A. The Non-Elastomeric Polymer

Non-elastomeric polymers useful in forming coating mixtures of this invention include polymers selected generally from among many classes. The selected polymers may be soluble in a solvent, but for the purpose of this invention, they will be used as an aqueous dispersion. Aqueous dispersions are formed either by emulsion polymerization, or by phase inversion by dispersing a polymer dissolved in solvent into water (a non-solvent). Such polymers include, without limitation, polyesters, polyester containing polymers, polyamides, chlorinated polymers, polyolefins, polyurethanes, polyethers, polyketones, polycarbonates, acrylics, vinylics and fluoropolymers. A preferred chlorinated polymer is polyvinylidene chloride (PVDC) and its copolymers and blends. Preferred polyesters include those polyesters with $T_g$ values less than 70° C., preferably less than 35° C.

Without being bound to any particular theory, Applicants believe the fact that the approach described in this invention works with these non-elastomeric polymers is surprising. When a dispersion of non-elastomeric polymer forms a coating it typically goes through several stages. First, the coating forms and dries to a collection of spherical particles of polymer separated by surfactant. When heated to higher temperatures, the particles deform to become more space filling. Eventually, polymer inter diffuses through the regions containing surfactant to form a fully coalesced film. When there is a substantial amount of exfoliated nanodispersed filler in the initial formulation, it is surprising that these relative rigid dispersed spherical particles of polymer (as compared to elastomeric polymers described in U.S. Pat. No. 6,087,016 to Feeney et al) deform in order to make a nanocomposite film with the platelet filler particles. The large reductions in permeability that have been seen are evidence that this phenomena occurs. On the other hand, the films have not been heated to the melting point, and the detailed mechanism is not fully understood at this time.

The polyesters used in accordance with the practice of the present invention are generally obtained by known polymerization techniques from aliphatic or aromatic dicarboxylic acids with saturated aliphatic or aromatic diols. Preferred aromatic diacid monomers are the lower alkyl esters such as the dimethyl esters of terephthalic acid or isophthalic acid. Typical aliphatic dicarboxylic acids include adipic, sebacic, azelaic, dodecanedioic acid or 1,4-cyclohexanedicarboxylic acid. The preferred aromatic dicarboxylic acid or its ester or anhydride is esterified or trans-esterified and polycondensed with the saturated aliphatic or aromatic diol. Typical saturated aliphatic diols preferably include the lower alkane-diols such as ethylene glycol. Typical cycloaliphatic diols include 1,4-cyclohexane diol and 1,4-cyclohexane dimethanol. Typical aromatic diols include aromatic diols such as hydroquinone, resorcinol and the isomers of naphthalene diol (1,5-; 2,6-; and 2,7-). Various mixtures of aliphatic and aromatic dicarboxylic acids and saturated aliphatic and aromatic diols may also be used. Most typically, aromatic dicarboxylic acids are polymerized with aliphatic diols to produce polyesters, such as polyethylene terephthalate (terephthalic acid+ethylene glycol). Additionally, aromatic dicarboxylic acids can be polymerized with aromatic diols to produce wholly aromatic polyesters, such as polyphenylene terephthalate (terephthalic acid+hydroquinone). Some of these wholly aromatic polyesters form liquid crystalline phases in the melt and thus are referred to as "liquid crystal polyesters" or LCPs.

Also included are those polyesters containing A-B monomers. The polyesters described above are derived from what is known as A-A and B-B type monomers. That is, monomers that contain the same polymerizable group whether it is a diacid (terephthalic acid) or diol (ethylene glycol). However, polyesters can also be derived from what is known as A-B monomers, where there are two different polymerizable groups on each molecule. Examples of A-B monomers would include 4-hydroxy benzoic acid (HBA) and the various isomers of hydroxy naphthoic acid (HNA). These monomers could polymerize to form a homopolyester such as poly (HBA) or copolymerize with any A-A and/or B-B monomer.

Examples of polyesters include; polyethylene terephthalate; poly(1,4-butylene) terephthalate; and 1,4-cyclohexylene dimethylene terephthalate/isophthalate copolymer and other linear homopolymer esters derived from aromatic dicarboxylic acids, including isophthalic acid, bibenzoic acid, naphthalene-dicarboxylic acid including the 1,5-; 2,6-; and 2,7-naphthalene-dicarboxylic acids; 4,4,-diphenylene-dicarboxylic acid; bis(p-carboxyphenyl) methane acid; ethylene-bis-p-benzoic acid; 1,4-tetramethylene bis(p-oxybenzoic) acid; ethylene bis(p-oxybenzoic) acid; 1,3-trimethylene bis(p-oxybenzoic) acid; and 1,4-tetramethylene bis(p-oxybenzoic) acid, and diols selected from the group consisting of 2,2-dimethyl-1,3-propane diol; cyclohexane dimethanol and aliphatic glycols of the general formula HO(CH$_2$)$_n$OH where n is an integer from 2 to 10, e.g., ethylene glycol; 1,4-tetramethylene glycol; 1,6-hexamethylene glycol; 1,8-octamethylene glycol; 1,10-decamethylene glycol; and 1,3-propylene glycol; and polyethylene glycols of the general formula HO(CH$_2$CH$_2$O)$_n$H where n is an integer from 2 to 10,000, and aromatic diols such as hydroquinone, resorcinol and the isomers of naphthalene diol (1,5-; 2,6-; and 2,7). There can also be present one or more aliphatic dicarboxylic acids, such as adipic, sebacic, azelaic, dodecanedioic acid or 1,4-cyclohexanedicarboxylic acid.

Also included are polyester containing polymers such as polyesteramides, polyesterimides, polyesteranhydrides, polyesterethers, polyesterketones and the like.

PVDC containing polymers used in accordance with this invention include the homopolymer of PVDC and its copolymers and blends. Particularly preferred copolymers include those with polyvinyl chloride (PVC) and chlorinated PVC (CPVC). Other copolymers are those containing any moiety derived from copolymerization with an active double bond such as an alkene, haloalkene or any of the acrylic containing monomers. Suitable examples include alkenes such as ethylene and vinyl acetate and acrylics such as the alkyl esters of acrylic or methacrylic acids.

Suitable polyolefin resins include material made by polymerizing such olefins as ethylene, propylene, butene-1, pentene-1,4-methylpent-1-ene, etc., in conventional manner.

Useful polyolefins are high-density polyethylene (HDPE) and polypropylene. Other polyolefin homopolymers and copolymers of ethylene can be utilized in the practice of this invention. Such other polyolefins include low-density polyethylene (LDPE), very low-density polyethylene (VLDPE), linear low-density polyethylene (LLDPE) and polybutylene (PB). However, these other polyolefins can be blended with other polyolefins such as polypropylene or high-density polyethylene (HDPE).

Polyamide resins useful in the practice of the invention are well-known in the art and include semi-crystalline and amorphous resins, which may be produced for example by condensation polymerization of equimolar amounts of saturated dicarboxylic acids containing from 4 to 12 carbon atoms with diamines, by ring opening polymerization of lactams, or by copolymerization of polyamides with other components, e.g. to form polyether polyamide block copolymers. Examples of polyamides include polyhexamethylene adipamide (nylon 66), polyhexamethylene azelaamide (nylon 69), polyhexamethylene sebacamide (nylon 610), polyhexamethylene dodecanoamide (nylon 612), polydodecamethylene dodecanoamide (nylon 1212), polycaprolactam (nylon 6), polylauric lactam, poly-11-aminoundecanoic acid, and copolymers of adipic acid, isophthalic acid, and hexamethylene diamine.

Other suitable non-elastomeric polymers include aliphatic polyethers such as poly(alkylene oxides), including poly(ethylene oxide) and poly(propylene oxide) and aromatic polyethers such as poly(2,6-dimethyl-1,4-phenylene oxide) and phenylene ether copolymers formed from 2,6-dimethylphenol and 2,3,6-trimethylphenol. Polyphenylene sulfide can also be used as well as polysulfones formed from diaryl sulfones and polyethersulfones formed from the diaryl sulfone group in combination with an ether such as bisphenol A.

Still other non-elastomeric polymers include polycarbonates, such as those prepared from bisphenol A and similar materials; polyketones (including polyetherketones and polyetheretherketones), such as PEEK®; acrylic polymers and copolymers, such as poly(alkyl methacrylates); polyurethanes; and vinyl polymers and copolymers derived from moieties such as polystyrene, polyacrylonitrile and polyvinyl acetate; vinyl acetate copolymers, such as ethylene/vinyl acetate; and polyacrylamide polymers and copolymers.

Still more non-elastomeric polymers include fluoropolymers such as polytetrafluoroethylene (PTFE), fluorinated ethylene-propylene (FEP), polyvinylidene fluoride (PVDF), poly ethylene-tetrafluoroethylene (E-TFE), poly ethylene-chlorotrifluoroethylene (E-CTFE), polyvinyl fluoride (PVF), poly chlorotrifluoroethylene-vinylidene fluoride (CTFE- VDF), polychlorotrifluoroethylene (PCTFE), tetrafluoroethylene/hexafluoropropylene/-vinylidene fluoride (THV) and amorphous fluoropolymers The polymer is preferably capable of forming a dispersion, latex, suspension or emulsion in water, or a mixture of water with a solvent. Particularly preferred non-elastomeric polymers are polyvinylidene chloride containing polymers (such as Rohm & Haas SERFENE® 2022) and polyesters, particularly with $T_g$ values lower than 70° C., preferably lower than 35° C., such as Eastman WD-30. Specifically exemplified below are coating mixtures of the invention employing these polymers.

B. The Filler

The coating mixtures of this invention as described above also include a dispersed layered filler which, upon mixture, has an inherently high aspect ratio, which can range from about 25 to as high as about 30,000. The presently preferred filler is vermiculite. More particularly, a desirable vermiculite is MICROLITE® 963 water-based vermiculite dispersion (W. R. Grace) [See, EP Application No. 601,877, published Jun. 15, 1994] which is a 7.5% by weight aqueous solution of dispersed mica. One novel aspect of the mixtures of the present invention is the aspect ratio of the selected filler in the dried coating. According to this invention, in the dried coating, the filler remains substantially dispersed and well orientated. In the dried coatings of this invention, the layered filler is present at a minimum of about 5% by weight to a maximum of about 60% of the dried coating. The compositions of the present invention, when dried, retain the filler in well-dispersed form, resulting in a large reduction in permeability.

Examples of filler include exfoliated silicates, for example, bentonite, vermiculite, montmorillonite, nontronite, beidellite, volkonskoite, hectorite, saponite, laponite, sauconite, magadiite, kenyaite, ledikite and mixtures thereof. MICROLITE® vermiculite is the preferred filler because of its very high aspect ratio. The vermiculite plates have an average lateral size of between 10 and 30 microns. The plates are largely exfoliated in water, and thus their thickness is 1-3 nm. The aspect ratio of the filler in water dispersion is an average of 10,000-30,000. It is clear that many plates reassemble during the coating and drying process of the present invention. However, it is a great advantage to start with as large an aspect ratio as possible. The selection and use of other known silicates which have properties similar to those of MICROLITE® vermiculite, as well as sufficiently high aspect ratios, are expected to be obvious to one of skill in the art following the teachings of this invention.

Large aspect ratio platelets in the filler can be locally oriented. The mesoscopic nature of the suspended plates is a direct consequence of the aspect ratio. A simple demonstration of the large aspect ratio of MICROLITE® 963 is the fact that oriented macroscopic domains can be observed when it is dispersed in water at a concentration of 0.02% by weight, or 0.01% by volume. The concentration above which a platelet filler will be locally oriented in suspension is given approximately by 1/aspect ratio. Thus fillers that start with an aspect ratio of 25 would have to be deployed above 4% by volume in a dispersion to achieve high local orientation.

Although MICROLITE® 963 vermiculite (W. R. Grace) is preferred, good results may also be achieved with other exfoliated grades of MICROLITE® vermiculite (i.e., grades 963++, 923, and 903). Other layered silicates are also useful in the barrier coatings and films of this invention. In particular are SOMASIF™ ME-100 from CO-OP Chemical co. Ltd. (Tokyo, Japan) and SCPX-2041 from Southern Filler Products (Gonzales, Tex.). The effectiveness of other silicates in the barrier coating of this invention depends upon the lateral size of the platelets, the degree of exfoliation in water, and the degree to which they reassemble to form larger particles during the coating and drying process.

A barrier coating can include a pre-treatment of the exfoliated silicate filler with acid or base. While there is not yet a full understanding of the mechanism that takes place between the acid or base and the filler particles, the key reasons to use such a treatment include:

1. Improved compatibility of the aqueous polymer dispersion and the aqueous dispersed filler. This is still quite different from other work aimed at improving the compatibility of the polymer and the filler. Organic groups are not being put on the flat surface to the filler in any significant amount (because those groups are negatively charged and wouldn't stick to that surface).
2. Improved stability of the coating formulation.

In both cases, the acid or base treatment can modify the detailed interaction among filler particles, and between the filler and the polymer dispersed in the water. It may also modify the interaction with surfactants and thickeners. Although these interactions are not fully understood, the improvements observed probably arise from one or both of the following mechanisms:

a) Chemical modification of the filler—i.e. the attachment of acid or base groups to the edges or at defects in the filler structure. In addition, the treatment may remove metal ions from the filler, further changing its interaction with charged surfactants and other components in the formulation b) Physical changes in the plate structure: If the acid or base treatment locally modifies the filler at defects and or impurities, it may cause the plates to bend. If the plates are not flat, they will have regions where they are in contact. On the other hand, they cannot fully agglomerate into larger filler particles when they are not flat. These types of physical changes are consistent with observation of changes in viscosity and stability when the filler is treated. Physical changes such as those described are also consistent with the fact that the changes are not reversible when an acid treated filler is subsequently treated with a base. If physical changes are critical to improved properties, such changes may be achieved by methods other than acid or base treatment.

C. Surfactants and Other Additives

Coating mixtures of this invention can also contain at least one or more than one suitable surfactant to reduce surface tension. Surfactants include materials otherwise known as wetting agents, anti-foaming agents, emulsifiers, dispersing agents, leveling agents etc. Surfactants can be anionic, cationic and nonionic, and many surfactants of each type are available commercially. A suitable surfactant for inclusion in these compositions possesses a critical micelle concentration sufficiently low to ensure a dried coating uncompromised by residual surfactant. Preferably, the surfactant(s) useful in the methods and dispersions of this invention are nonionic, particularly useful with a highly charged filler, such as vermiculite. In the event of an unfavorable interaction of the anionic emulsifier present in the latex dispersion, any additional ionic additives must be kept to a minimum. This variable is eliminated where the surfactant or emulsifier is non-ionic. Increase in ionic concentration of the compositions containing vermiculite, such as by the addition of a base to adjust pH, e.g., KOH, $NH_4OH$ and NaOH can cause agglomeration of the filler, which adversely affects permeability reduction.

Cationic surfactants that can ion exchange with the alkali metal counterions present in the layered silicates have not been used. They will typically make the filler surface hydrophobic, and thus make a stable water suspension impossible. Limited quantities of cationic surfactants may be included as long as they don't adversely affect the coating formulation stability.

Desirable surfactants employed in the examples below are the non-ionic siloxane-based, SILWET® L-77 wetting agent [OSI Specialties, Inc.], and FOAMASTER® VL defoamer (Henkel), among others.

Other suitable surfactants may also be selected. The amount and number of surfactants added to the coating dispersion or composition will depend on the particular surfactant(s) selected, but should be limited to the minimum amount of surfactant that is necessary to achieve wetting of the substrate while not compromising the performance of the dried coating. For example, typical surfactant amounts can be less than or equal to about 15% by weight of the dried coating.

Alternatively, the same surfactant molecule can be chemically bonded to the polymer as 1) a copolymer moiety or 2) an added reactive moiety that can later react with the polymer.

Other optional components of the coating mixture include conventional agents to adjust pH, such as bases for example, $NH_4OH$, NaOH or KOH, among others or acids for example, acetic acid, glycine or citric acid, among others provided that care is taken to avoid agglomeration, as discussed above.

In another embodiment, thickeners may be used in the coating formulations to adjust viscosity. One of skill in the art would readily determine and adjust the type and amounts of thickener depending on the type and amount of filler employed in the coating mixture based on the teachings contained herein.

When a film or coating limits the diffusion of any molecule or chemical, it is well known that the penetration of the said molecule can be further reduced by the addition of absorbers or getters to either the coating, or in a layer or material below the coating. This concept is used commercially in Honeywell's AEGIS™ Nylon films to block the diffusion of oxygen. It is clear that the same concept can be used in conjunction with nanocomposite coatings to block the penetration of oxygen, water, chemical warfare agents, or any other material. The use of such absorbers will not have a large effect on the steady state permeability, but it will primarily affect the time it takes for the first molecules to diffuse through the system. This breakthrough time is most important in packaging, chemical protective, and electronic applications.

D. The Carrier Liquid

The coating mixtures of this invention are present in a suitable carrier liquid that is predominantly water. Combinations of water with an organic carrier may also be used as the carrier liquid. Examples of suitable organic carriers could include hexane, heptane, toluene, isopropyl alcohol, cyclohexanone, ethanol, methanol, other hydrocarbons, and combinations thereof. Selection of a suitable organic solvent carrier is within the skill of the art.

E. Embodiments of Barrier Mixtures

One example of a barrier coating mixture useful for application to a substrate or interface according to this invention comprises coating formed by a barrier coating mixture comprising: (a) a water dispersed non-elastomeric polymer; (b) an exfoliated layered platelet filler which may be treated with an acid or a base having an aspect ratio greater than 25; and (c) at least one additive, wherein the total solids content of said mixture is less than 30% and the filler is present in amounts of 5-60% of the total. These barrier coating mixtures result in films with reductions in permeability of 5 times to as high as 1500 times or even higher relative to the unfilled polymer. These results are substantially higher than the prior art on other platelet filled barrier coatings.

In a preferred embodiment, the coating mixtures described above have total solids contents equal to or less than 30%, with the filler comprising from 5-60% of the total solids and between about 0.1% to about 15% by weight of additive(s) in the solid content. The dried coatings of the mixtures described above, contain fillers which reduces the gas permeability greater than 5-fold that of the dried, unfilled polymer alone.

One preferred coating mixture useful in this invention has a solids content of between about 5 to about 25% by weight and the dried coating comprises between about 65% to about 95% by weight of a water dispersed non-elastomeric polymer, between about 5% to about 35% by weight of a vermiculite filler and between about 0.1% to about 15% total additive weight percent. As described in examples below, the selected polymers are PVDC containing polymers, e.g. Rohm & Haas SERFENE® 2022 and Eastman WD-30 polyester. Additional preferred barrier coating mixtures useful in this invention may be prepared by methods described in detail in Examples 3-9 and 12-20.

III. The Coated Article

Once prepared as described in detail in Examples 3-9 and 12-20 below, the coating mixtures may be applied to a suitable substrate to reduce the permeation rate through the substrate to gas. Upon drying, the dried coating can include a polymer in the mixture at a weight percent of at least about 65%. The filler is preferably present in said mixture when dried at greater than about 5% by weight. The dried coating reduces the gas permeability greater than 5-fold that of the dried, unfilled polymer alone. As indicated in Examples 3-9 and 12-20, reductions in permeability attributed to compositions of this invention can range from approximately 5 times to about 1500 times or even higher that of unfilled polymer alone.

Examples of desirable substrates include films, particularly packaging films (including antiseptic, corrosion protective, vacuum and controlled atmosphere packages), blow molded or thermoformed containers and articles, electronic displays and other surfaces.

IV. Methods of Coating a Substrate or Forming a Film

The articles to be coated by the compositions of the invention may be previously untreated or may have a variety of pre-treatments to their surfaces, depending upon the identity and utility of the article. For example, the article may have on at least one side a heat seal layer. Such heat seal layers may be made of an ethylene-propylene copolymer or ethylene-propylene-butylene terpolymer. Thus, the coating dispersion is applied on the surface of the heat seal layer. Alternatively, the substrate or article may comprise a protective topcoat layer, such as polyurethane or fluoropolymers such as TEFLON®-type materials [DuPont] for abrasion resistance, etc. Such topcoats may be selected by one of skill in the art. The coatings of this invention may be applied over or under the topcoat layer.

Alternatively, the coating mixtures of the invention may be applied to a releasable mold in order to form a film, rather than a coated article. The film thus consists of a dried mixture of the above-described polymer and greater than 5% by weight of the layered filler having an aspect ratio greater than 25. The film, which may be in the form of a membrane, may itself be employed as a gas barrier layer for use in various laboratory procedures, or as a glove or balloon material. Such a dried, free-standing film or membrane is characterized by a reduction in gas permeability greater than 5-fold the permeability of a film formed of the dried polymer alone.

To form the coated article or free-standing film of this invention, the coating mixtures of this invention may be applied to the selected surface or article by techniques including, without limitation, roll coating, spray coating, brush coating and dip coating techniques. Roll coating techniques include, but are not limited to, rod, reverse roll, forward roll, air knife, knife over roll, blade, gravure and slot die coating methods. General descriptions of these types of coating methods may be found in texts, such as Modern Coating and Drying Techniques, (E. Cohen and E. Gutoff, eds; VCH Publishers) New York (1992) and Web Processing and Converting Technology and Equipment, (D. Satas, ed; Van Nostrand Reinhold) New York (1984). Three dimensional articles may preferably be coated by the techniques which include, but are not limited to, spray coating or dip coating. The method of application is not a limitation on the present invention, but may be selected from among these and other well-known methods by the person of skill in the art. However, the coating must be applied so that drying takes place on the substrate and not in the air (i.e. powder coating). If drying takes place during spraying or other means of application, agglomeration may occur.

The coating mixtures may be applied to a substrate or a mold at any desired thickness, depending on the substrate, the purpose for which the coating is being applied and the ultimate use of the coated article. Thus, for example, the coating mixtures of the present invention may be applied to an article or substrate by the methods described above to form a dried coating of a thickness between about 0.1 μm to about 200 μm of dry coating. Such adjustments are well within the skill of the art [See, e.g., Canadian Patent No. 993,738].

After coating, the coated article or mold may be dried at a selected temperature, e.g., room temperature or greater than room temperature. The selection of the drying temperature, relative humidity, and convective air flow rates depends on the desired time for drying; that is, reduced drying times may be achieved at elevated air temperatures, lower relative humidity and higher rates of air circulation over the drying coating surface. One of skill in the art can readily adjust the drying conditions as desired.

The dried coatings exhibit a surprising reduction in permeability compared to the prior art and particularly compared to unfilled polymers. As evidenced in the Examples below, reductions in permeability caused by the dried coatings of this invention are shown to be from about 5 fold to 1500 fold and even higher relative to the unfilled polymers alone. The evaluation of permeability of the coatings of the present invention is determined using the following parameters. The oxygen transmission rate (OTR) of the dried coating on the article, or the free-standing film, is generally measured using conventional apparatus, such as a Mocon OX-TRAN 2/20 module. OTR units are cc/m² day at 1 atmosphere, 0% relative humidity at 23° C. The permeability of the coating is calculated by multiplying the OTR and coating thickness. Permeability units are cc mm/m² day atmosphere at 0% relative humidity at 23° C. If the coating is on a known substrate, the permeability of the known substrate is subtracted out using the following equation:

Permeability of the barrier coating=$X_1/[(1/OTR)-(X_2/P_{X2})]$ where $X_1$ is barrier coating thickness; $X_2$ is substrate thickness and $P_{X2}$ is permeability of the substrate. The reduction in permeability from the unfilled polymer is calculated by dividing the permeability of the unfilled polymer by the permeability of the filled polymer. Reduction in permeability is a unitless ratio.

EXAMPLES

Experimental Procedures a) Oxygen Transmission Rate Testing

Films and coated substrates are tested for oxygen transmission rate using a Mocon OXTRAN 2/20 or 2/60 module at 23° C. and 0% RH. The samples are loaded onto the modules and conditioned for 2 hours prior to testing for oxygen. Once equilibrium is reached, an OTR (oxygen transmission rate) is reported in units of cc/m² day atm.

b) Thickness Measurements

All thickness calculations are based on the weight of the coating, and an assumed density. The density for the polymer phase is assumed to be 0.95 gm/cc in all cases, even though it is recognized that each polymer has a different density. The density of the nanocomposite was estimated using a rule of mixtures, and an assumed density of the clay of 2 gm/cc. Correcting this for the actual density will slightly modify the permeability values, but will have little effect on the number of times reduction reported in Tables 1-2.

The thickness of the coating on a substrate is measured after the OTR is reported. Each sample is removed from the Mocon module and a circle of specified size cut from the sample. The cut circle is weighed. The weight of the coating is obtained from subtracting the weight of the uncoated circle and the thickness calculated from the size of the circle and weight of the coating. The thickness of the film is reported in millimeters and used to calculate the permeability of the film.

c) Permeability Calculations

Permeability is calculated using the thickness of the film and the OTR of the sample in the following equation:

Coating Permeability=(coating thickness)/[(1/*OTR*)−(substrate thickness/substrate permeability)]

The benefit of obtaining the permeability of the coating versus the OTR of the sample is that permeability reports the OTR at a specified thickness. Therefore, different coatings can be compared directly This is important when determining the performance of a coating on varying substrates and at different thickness.

Treated Filler Procedures

The MICROLITE® exfoliated silicate (W. R. Grace, 7.5%) was treated with acid or base using the following procedures:

A. 18% Acid or Base by Weight of Filler

In a 2 liter plastic jar with a lid was weighed 600 grams of MICROLITE® 963. To this dispersed silicate filler was added 8.3 grams of acid or base (100% concentrated) in 303 grams of distilled water. The resulting dispersion was mixed for a determined amount of time in the closed container at room temperature. After the determined amount of time (See example for specific time), the treated filler was used immediately.

B. 2% Acid or Base by Weight of Filler

In a 2 liter plastic jar with a lid was weighed 600 grams of MICROLITE® 963. To this dispersed silicate filler was added 0.9 grams of acid or base (100% concentrated) in 310 grams of distilled water. The resulting dispersion was mixed for a determined amount of time in the closed container at room temperature. After the determined amount of time (See example for specific time), the treated filler was used immediately.

C. 61% Acid or Base by Weight of Filler

In a 2 liter plastic jar with a lid was weighed 600 grams of MICROLITE® 963. To this dispersed silicate filler was added 27.3 grams of acid or base (100% concentrated) in 283.7 grams of distilled water. The resulting dispersion was mixed for a determined amount of time in the closed container at room temperature. After the determined amount of time (See example for specific time), the treated filler was used immediately.

D. 100% Acid or Base by Weight of Filler

In a 2 liter plastic jar with a lid was weighed 600 grams of MICROLITE® 963. To this dispersed silicate filler was added 45.5 grams of acid or base (100% concentrated) in 265.5 grams of distilled water. The resulting dispersion was mixed for a determined amount of time in the closed container at room temperature. After the determined amount of time (See example for specific time), the treated filler was used immediately:

PVDC Nanocomposites

Example 1

PVDC Unfilled

An aqueous barrier coating solution according to this invention is prepared as follows, in which the matrix is polyvinylidene chloride (PVDC). This film does not contain filler and was made for reference.

In an 8 oz jar, 50 grams of PVDC latex (SERFENE 2022, 50.5% solids, Rohm & Haas) was stirred with 3.0 grams of COATOSIL 1301 (OSI). After this coating solution is applied to a polypropylene film substrate and allowed to dry, the unfilled PVDC coating is evaluated.

The oxygen transmission rate (OTR) is measured using a Mocon OX-TRAN 2/20 module. The OTR for the PVDC film on polypropylene is 9.2 cc/m$^2$ day @ 1 atmosphere, 0% RH, 23° C. Permeability of the 44.7 micron thick PVDC film is 0.4 cc mm/m$^2$ day atmosphere @ 0% RH, 23° C.

Example 2

PVDC Nanocomposite

Untreated Filler

An aqueous barrier coating solution according to this invention is prepared as follows, in which the matrix is polyvinylidene chloride (PVDC, SERFENE 2022, 50.5%) and the filler is MICROLITE® exfoliated silicate. The filler was untreated in this example and used as received.

In an 8 oz jar, 1.1 grams of Acusol® 880 (35.2%, Rohm & Haas), 2.28 grams of ACUSOL® 882 (17.1%, Rohm & Haas) and 22.7 grams of distilled water were weighed. A stir bar was added and the solution was stirred slowly overnight. To this solution was added a mixture of 29.34 grams of PVDC latex (SERFENE 2022), 2 grams of COATOSIL 1300 (OSI), 4 drops of FOAMASTER VL (Cognis) and 27.58 grams of distilled water. The resulting solution was mixed thoroughly. An additional 15 grams of distilled water was then added and mixed with a stir bar.

To the above solution, 52 grams of MICROLITE® 963 (7.5%, W. R. Grace) and 35 grams of distilled water were added. The resulting solution was stirred with a stir bar. The resulting dispersion at room temperature is ready for application, e.g., spray-coating, onto a plastic or rubber substrate. The coating mixture has 11.3% solids in water content.

After this coating solution is applied to a polypropylene film substrate and allowed to dry, the coating contains 73.7% by weight PVDC, 19.4% by weight filler, 3.0% COATOSIL 1300 wetting agent, 1.9% by weight ACUSOL 880, 1.9% by weight ACUSOL 882 and 0.1% by weight FOAMASTER VL anti-foaming agent.

The oxygen transmission rate (OTR) is measured using a Mocon OX-TRAN 2/20 module. The OTR is 1.0 cc/m$^2$ day @ 1 atmosphere, 0% RH, 23° C. Permeability of the 19.7 micron PVDC nanocomposite is 0.02 cc mm/m$^2$ day atmosphere @ 0% RH, 23° C. The reduction in permeability of this coating is 20 times the reduction in permeability of the unfilled PVDC latex.

Example 3

PVDC Nanocomposite

18% Acetic Acid/3 Day Filler Pre-Treatment

An aqueous barrier coating solution according to this invention is prepared as follows, in which the matrix is polyvinylidene chloride (PVDC, SERFENE 2022, 50.5%) and the filler is MICROLITE® exfoliated silicate. The filler was treated in this example with 18% acetic acid for 3 days following treated filler procedure A.

In an 8 oz jar, 1.1 grams of ACUSOL® 880 (35.2%, Rohm & Haas), 2.28 grams of ACUSOL® 882 (17.1%, Rohm & Haas) and 22.7 grams of distilled water were weighed. A stir bar was added and the solution was stirred slowly overnight. To this solution was added a mixture of 29.34 grams of PVDC latex (SERFENE 2022), 2 grams of COATOSIL 1300 (OSI), 4 drops of FOAMASTER VL (Cognis) and 27.58 grams of distilled water. The resulting solution was mixed thoroughly.

To the above solution, 75 grams of treated filler from procedure A and 12 grams of distilled water were added. The resulting solution was stirred with a stir bar. The resulting dispersion at room temperature is ready for application, e.g., spray-coating, onto a plastic or rubber substrate. The coating mixture has 11.6% solids in water content.

After this coating solution is applied to a polypropylene film substrate and allowed to dry, the coating contains 73.7% by weight PVDC, 19.4% by weight filler, 3.0% COATOSIL 1300 wetting agent, 1.9% by weight ACUSOL 880, 1.9% by weight ACUSOL 882 and 0.1% by weight FOAMASTER VL anti-foaming agent.

The oxygen transmission rate (OTR) is measured using a Mocon OX-TRAN 2/20 module. The OTR is 0.5 cc/m day @ 1 atmosphere, 0% RH, 23° C. Permeability of the 16.0 micron PVDC nanocomposite is 0.008 cc mm/m$^2$ day atmosphere @ 0% RH, 23° C. The reduction in permeability of this coating is 50 times the reduction in permeability of the unfilled PVDC latex.

Example 4

PVDC Nanocomposite

18% Glycine/1 Day Filler Pre-Treatment

An aqueous barrier coating solution according to this invention is prepared as follows, in which the matrix is polyvinylidene chloride (PVDC, SERFENE 2022, 50.5%) and the filler is MICROLITE® exfoliated silicate. The filler was treated in this example with 18% glycine for 1 day following treated filler procedure A.

In an 8 oz jar, 1.1 grams of ACUSOL® 880 (35.2%, Rohm & Haas), 2.28 grams of ACUSOL® 882 (17.1%, Rohm & Haas) and 22.7 grams of distilled water were weighed. A stir bar was added and the solution was stirred slowly overnight. To this solution was added a mixture of 29.34 grams of PVDC latex (SERFENE 2022), 2 grams of COATOSIL 1300 (OSI), 4 drops of FOAMASTER VL (Cognis) and 27.58 grams of distilled water. The resulting solution was mixed thoroughly.

To the above solution, 75 grams of treated filler with 18% glycine from procedure A for 1 day and 12 grams of distilled water were added. The resulting solution was stirred with a stir bar. The resulting dispersion at room temperature is ready for application, e.g., spray-coating, onto a plastic or rubber substrate. The coating mixture has 13.4% solids in water content.

After this coating solution is applied to a polypropylene film substrate and allowed to dry, the coating contains 73.7% by weight PVDC, 19.4% by weight filler, 3.0% COATOSIL 1300 wetting agent, 1.9% by weight ACUSOL 880, 1.9% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m$^2$ day @ 1 atmosphere, 0% RH, 23° C. (lower limit of this module). Permeability of the 37.6 micron PVDC nanocomposite is <0.0038 cc mm/m$^2$ day atmosphere @ 0% RH, 23° C. The reduction in permeability of this coating is >105 times the reduction in permeability of the unfilled PVDC latex.

Example 5

PVDC Nanocomposite

18% Citric Acid/3 Day Filler Pre-Treatment

An aqueous barrier coating solution according to this invention is prepared as follows, in which the matrix is polyvinylidene chloride (PVDC, SERFENE 2022, 50.5%) and the filler is MICROLITE® exfoliated silicate. The filler was treated in this example with 18% citric acid for 3 days following treated filler procedure A.

In an 8 oz jar, 1.1 grams of ACUSOL® 880 (35.2%, Rohm & Haas), 2.28 grams of ACUSOL® 882 (17.1%, Rohm & Haas) and 22.7 grams of distilled water were weighed. A stir bar was added and the solution was stirred slowly overnight. To this solution was added a mixture of 29.34 grams of PVDC latex (SERFENE 2022), 2 grams of COATOSIL 1300 (OSI), 4 drops of FOAMASTER VL (Cognis) and 27.58 grams of distilled water. The resulting solution was mixed thoroughly.

To the above solution, 75 grams of treated filler with 18% citric acid from procedure A for 3 days and 12 grams of distilled water were added. The resulting solution was stirred with a stir bar. The resulting dispersion at room temperature is ready for application, e.g., spray-coating, onto a plastic or rubber substrate. The coating mixture has 13.4% solids in water content.

After this coating solution is applied to a polypropylene film substrate and allowed to dry, the coating contains 73.7% by weight PVDC, 19.4% by weight filler, 3.0% COATOSIL 1300 wetting agent, 1.9% by weight ACUSOL® 880, 1.9% by weight ACUSOL 882 and 0.1% by weight FOAMASTER VL anti-foaming agent.

The oxygen transmission rate (OTR) is measured using a Mocon OX-TRAN 2/20 module. The OTR is <0.2 cc/m$^2$ day @ 1 atmosphere, 0% RH, 23° C. (lower limit of this module). Permeability of the 26.4 micron PVDC nanocomposite is <0.0027 cc mm/m$^2$ day atmosphere @ 0% RH, 23° C. The reduction in permeability of this coating is >148 times the reduction in permeability of the unfilled PVDC latex.

Example 6

PVDC Nanocomposite

18% Citric Acid/30 Minute Filler Pre-Treatment

An aqueous barrier coating solution according to this invention is prepared as follows, in which the matrix is polyvinylidene chloride (PVDC, SERFENE 2022, 50.5%) and the filler is MICROLITE® exfoliated silicate. The filler was treated in this example with 18% citric acid for 30 minutes following treated filler procedure A.

In an 8 oz jar, 1.1 grams of ACUSOL® 880 (35.2%, Rohm & Haas), 2.28 grams of ACUSOL® 882 (17.1%, Rohm & Haas) and 22.7 grams of distilled water were weighed. A stir bar was added and the solution was stirred slowly overnight. To this solution was added a mixture of 29.34 grams of PVDC latex (SERFENE 2022), 2 grams of COATOSIL 1300 (OSI), 4 drops of FOAMASTER VL (Cognis) and 27.58 grams of distilled water. The resulting solution was mixed thoroughly.

To the above solution, 75 grams of treated filler with 18% citric acid from procedure A for 30 minutes and 12 grams of distilled water were added. The resulting solution was stirred with a stir bar. The resulting dispersion at room temperature is ready for application, e.g., spray-coating, onto a plastic or rubber substrate. The coating mixture has 13.4% solids in water content.

After this coating solution is applied to a polypropylene film substrate and allowed to dry, the coating contains 73.7% by weight PVDC, 19.4% by weight filler, 3.0% COATOSIL 1300 wetting agent, 1.9% by weight ACUSOL® 880, 1.9% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m$^2$ day @ 1 atmosphere, 0% RH, 23° C. (lower limit of this module). Permeability of the 25.8 micron PVDC nanocomposite is <0.0026 cc mm/m$^2$ day atmosphere @ 0% RH, 23° C. The reduction in permeability of this coating is >153 times the reduction in permeability of the unfilled PVDC latex.

Example 7

PVDC Nanocomposite

2% Acetic Acid/3 Day Filler Pre-Treatment

An aqueous barrier coating solution according to this invention is prepared as follows, in which the matrix is polyvinylidene chloride (PVDC, SERFENE 2022, 50.5%) and the filler is MICROLITE® exfoliated silicate. The filler was treated in this example with 2% acetic acid for 3 days following treated filler procedure B.

In an 8 oz jar, 1.1 grams of ACUSOL® 880 (35.2%, Rohm & Haas), 2.28 grams of ACUSOL® 882 (17.1%, Rohm & Haas) and 22.7 grams of distilled water were weighed. A stir bar was added and the solution was stirred slowly overnight. To this solution was added a mixture of 29.34 grams of PVDC latex (SERFENE 2022), 2 grams of COATOSIL 1300 (OSI), 4 drops of FOAMASTER VL (Cognis) and 27.58 grams of distilled water. The resulting solution was mixed thoroughly.

To the above solution, 75 grams of treated filler with 2% acetic acid from procedure B for 3 days and 12 grams of distilled water were added. The resulting solution was stirred with a stir bar. The resulting dispersion at room temperature is ready for application, e.g., spray-coating, onto a plastic or rubber substrate. The coating mixture has 13.4% solids in water content.

After this coating solution is applied to a polypropylene film substrate and allowed to dry, the coating contains 73.7% by weight PVDC, 19.4% by weight filler, 3.0% COATOSIL 1300 wetting agent, 1.9% by weight ACUSOL® 880, 1.9% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m$^2$ day @ 1 atmosphere, 0% RH, 23° C. (lower limit of this module). Permeability of the 20.1 micron PVDC nanocomposite is <0.0040 cc mm/m$^2$ day atmosphere @ 0% RH, 23° C. The reduction in permeability of this coating is >100 times the reduction in permeability of the unfilled PVDC latex.

Example 8

PVDC Nanocomposite

61% Acetic Acid/3 Day Filler Pre-Treatment

An aqueous barrier coating solution according to this invention is prepared as follows, in which the matrix is polyvinylidene chloride (PVDC, SERFENE 2022, 50.5%) and the filler is MICROLITE® exfoliated silicate. The filler was treated in this example with 61% acetic acid for 3 days following treated filler procedure C.

In an 8 oz jar, 1.1 grams of ACUSOL® 880 (35.2%, Rohm & Haas), 2.28 grams of ACUSOL® 882 (17.1%, Rohm & Haas) and 22.7 grams of distilled water were weighed. A stir bar was added and the solution was stirred slowly overnight. To this solution was added a mixture of 29.34 grams of PVDC latex (SERFENE 2022), 2 grams of COATOSIL 1300 (OSI), 4 drops of FOAMASTER VL (Cognis) and 27.58 grams of distilled water. The resulting solution was mixed thoroughly.

To the above solution, 75 grams of treated filler with 61% acetic acid from procedure C for 3 days and 12 grams of distilled water were added. The resulting solution was stirred with a stir bar. The resulting dispersion at room temperature is ready for application, e.g., spray-coating, onto a plastic or rubber substrate. The coating mixture has 13.4% solids in water content.

After this coating solution is applied to a polypropylene film substrate and a polyethylene terephthalate film and allowed to dry, the coating contains 73.7% by weight PVDC, 19.4% by weight filler, 3.0% COATOSIL 1300 wetting agent, 1.9% by weight ACUSOL® 880, 1.9% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m$^2$ day @ 1 atmosphere, 0% RH, 23° C. (lower limit of this module). Permeability of the 26.0 micron PVDC nanocomposite is <0.0028 cc mm/m$^2$ day atmosphere @ 0% RH, 23° C. The reduction in permeability of this coating is >142 times the reduction in permeability of the unfilled PVDC latex.

Example 9

PVDC Nanocomposite

100% Acetic Acid/2 Day Filler Pre-Treatment

An aqueous barrier coating solution according to this invention is prepared as follows, in which the matrix is polyvinylidene chloride (PVDC, SERFENE 2022, 50.5%) and the filler is MICROLITE® exfoliated silicate. The filler was treated in this example with 100% acetic acid for 2 days following treated filler procedure D.

In an 8 oz jar, 1.1 grams of ACUSOL® 880 (35.2%, Rohm & Haas), 2.28 grams of ACUSOL® 882 (17.1%, Rohm & Haas) and 22.7 grams of distilled water were weighed. A stir bar was added and the solution was stirred slowly overnight. To this solution was added a mixture of 29.34 grams of PVDC latex (SERFENE 2022), 2 grams of COATOSIL 1300 (OSI), 4 drops of FOAMASTER VL (Cognis) and 27.58 grams of distilled water. The resulting solution was mixed thoroughly.

To the above solution, 75 grams of treated filler with 100% acetic acid from procedure D for 2 days and 12 grams of distilled water were added. The resulting solution was stirred with a stir bar. The resulting dispersion at room temperature is ready for application, e.g., spray-coating, onto a plastic or rubber substrate. The coating mixture has 13.4% solids in water content.

After this coating solution is applied to a polypropylene film substrate and allowed to dry, the coating contains 73.7% by weight PVDC, 19.4% by weight filler, 3.0% COATOSIL 1300 wetting agent, 1.9% by weight ACUSOL® 880, 1.9% by weight ACUSOL® 882 and 0.1% by weight FOAMASTER VL anti-foaming agent.

The oxygen transmission rate (OTR) is measured using a Mocon OX-TRAN 2/20 module. The OTR is 3.43 cc/m$^2$ day @ 1 atmosphere, 0% RH, 23° C. Permeability of the 21.0 micron PVDC nanocomposite is 0.070 cc mm/m$^2$ day atmosphere @ 0% RH, 23° C. The reduction in permeability of this coating is 6 times the reduction in permeability of the unfilled PVDC latex.

A summary of the data obtained in Examples 1-9 is listed in Table 1.

As can be seen from the tabulated data, large reductions in permeability, over untreated filler, are achieved utilizing fillers pre-treated with any of these three acids: acetic acid, glycine and citric acid. Moreover, these reductions in permeability can be realized for filler treatments ranging from as little as 2% by weight up to greater than 60% by weight of acid for periods ranging from 30 minutes to 3 days. Example 9 is shown to demonstrate a filler treatment level that is outside the scope of this invention.

TABLE 1

PVDC NANOCOMPOSITES

|  | Treatment[1] | Permeability[2] | Reduction in Permeability[3] | Example # |
| --- | --- | --- | --- | --- |
| Unfilled | n/a | 0.4 | n/a | 1 |
| Untreated | n/a | 0.02 | 20 | 2 |
| Treated | 18% Acetic acid, 3 day | 0.008 | 50 | 3 |
| Treated | 18% Glycine, 1 day | <0.0038 | >105 | 4 |
| Treated | 18% Citric acid, 3 day | <0.0027 | >148 | 5 |
| Treated | 18% Citric acid, 30 min | <0.0026 | >153 | 6 |
| Treated | 2% Acetic acid, 3 days | <0.0040 | >100 | 7 |
| Treated | 61% Acetic acid, 3 day | <0.0028 | >142 | 8 |
| Treated | 100% Acetic acid, 2 day | 0.07 | 6 | 9 |

Notes:
[1] The filler treatment is detailed in the examples.
[2] Permeability is oxygen permeability and reported in units of cc mm/m$^2$ day atm @ 23° C., 0% relative humidity.
[3] Reduction in permeability is reduction of the oxygen permeability of the nanocomposite relative to the oxygen permeability of the unfilled polymer reported in times reduction.

Polyester Nanocomposites

Example 10

Polyester Unfilled

An aqueous barrier coating solution according to this invention is prepared as follows, in which the matrix is polyester. This film does not contain filler and was made for reference.

In an 8 oz jar, 50 grams of polyester latex (WD-30, 30% solids, Eastman) was stirred with 3.0 grams of COATOSIL 1301 (OSI). After this coating solution is applied to a polypropylene film substrate and allowed to dry, the unfilled polyester coating is evaluated.

The oxygen transmission rate (OTR) is measured using a Mocon OX-TRAN 2/20 module. The OTR for the polyester film on polypropylene is 42.3 cc/m$^2$ day @ 1 atmosphere, 0% RH, 23° C. Permeability of the 65.5 micron thick PVDC film is 2.8 cc mm/m$^2$ day atmosphere @ 0% RH, 23° C.

Example 11

Polyester Nanocomposite, Untreated Filler

An aqueous barrier coating solution according to this invention is prepared as follows, in which the matrix is polyester (WD-30, Eastman, 30%) and the filler is MICROLITE® exfoliated silicate. The filler was untreated in this example and used as received.

In an 8 oz jar, 0.17 grams of ACUSOL® 880 (35.2%, Rohm & Haas), 0.35 grams of ACUSOL® 882 (17.1%, Rohm & Haas) and 28.15 grams of distilled water were weighed. A stir bar was added and the solution was stirred slowly overnight. To this solution was added a mixture of 32.69 grams of polyester latex (Eastman WD-30), 1.25 grams of COATOSIL 1300 (OSI), 4 drops of FOAMASTER VL (Cognis) and 9.38 grams of distilled water. The resulting solution was mixed thoroughly.

To the above solution, 32 grams of MICROLITE® 963 (7.5%, W. R. Grace) and 46 grams of distilled water were added. The resulting solution was stirred with a stir bar. The resulting dispersion at room temperature is ready for application, e.g., spray-coating, onto a plastic or rubber substrate. The coating mixture has 8.5% solids in water content.

After this coating solution is applied to a polypropylene film substrate and allowed to dry, the coating contains 77.2% by weight polyester, 18.9% by weight filler, 3.0% COATOSIL 1300 wetting agent, 0.5% by weight ACUSOL® 880, 0.5% by weight ACUSOL® 882 and 0.1% by weight FOAMASTER VL anti-foaming agent.

The oxygen transmission rate (OTR) is measured using a Mocon OX-TRAN 2/20 module. The OTR is 1.1 cc/m$^2$ day @ 1 atmosphere, 0% RH, 23° C. Permeability of the 27.9 micron polyester nanocomposite is 0.03 cc mm/m$^2$ day atmosphere @ 0% RH, 23° C. The reduction in permeability of this coating is 90 times the reduction in permeability of the unfilled polyester latex.

Example 12

Polyester Nanocomposite

18% Glycine/3 Day Filler Pre-Treatment

An aqueous barrier coating solution according to this invention is prepared as follows, in which the matrix is polyester (Eastman, WD-30, 30%) and the filler is MICROLITE® exfoliated silicate. The filler was treated in this example with 18% glycine for 3 days following treated filler procedure A.

In an 8 oz jar, 1.1 grams of ACUSOL® 880 (35.2%, Rohm & Haas), 2.28 grams of ACUSOL® 882 (17.1%, Rohm & Haas) and 13.15 grams of distilled water were weighed. A stir bar was added and the solution was stirred slowly overnight. To this solution was added a mixture of 51.09 grams of polyester latex (Eastman WD-30), 1.5 grams of COATOSIL 1300 (OSI), 4 drops of FOAMASTER VL (Cognis) and 29.38 grams of distilled water. The resulting solution was mixed thoroughly.

To the above solution, 75 grams of treated filler with 18% glycine from procedure A and 3 grams of distilled water were added. The resulting solution was stirred with a stir bar. The resulting dispersion at room temperature is ready for application, e.g., spray-coating, onto a plastic or rubber substrate. The coating mixture has a 11.7% solids in water content.

After this coating solution is applied to a polypropylene film substrate and allowed to dry, the coating contains 74.9% by weight polyester, 19.1% by weight filler, 2.2% COATOSIL 1300 wetting agent, 1.9% by weight ACUSOL 880, 1.9% by weight ACUSOL 882 and 0.1% by weight FOAMASTER VL anti-foaming agent.

The oxygen transmission rate (OTR) is measured using a Mocon OX-TRAN 2/20 module. The OTR is 0.2 cc/m$^2$ day @ 1 atmosphere, 0% RH, 23° C. Permeability of the 18.4 micron polyester nanocomposite is 0.0037 cc mm/m$^2$ day atmosphere @ 0% RH, 23° C. The reduction in permeability of this coating is 756 times the reduction in permeability of the unfilled polyester latex.

Example 13

Polyester Nanocomposite

18% Glycine/30 Minute Filler Pre-Treatment

An aqueous barrier coating solution according to this invention is prepared as follows, in which the matrix is polyester (Eastman, WD-30, 30%) and the filler is MICROLITE® exfoliated silicate. The filler was treated in this example with 18% glycine for 30 minutes following treated filler procedure A.

In an 8 oz jar, 0.17 grams of ACUSOL® 880 (35.2%, Rohm & Haas), 0.35 grams of ACUSOL® 882 (17.1%, Rohm & Haas) and 28.15 grams of distilled water were weighed. A stir bar was added and the solution was stirred slowly overnight. To this solution was added a mixture of 32.69 grams of polyester latex (Eastman WD-30), 1.25 grams of COATOSIL 1301 (OSI), 4 drops of FOAMASTER VL (Cognis) and 9.38 grams of distilled water. The resulting solution was mixed thoroughly.

To the above solution, 46.15 grams of treated filler with 18% glycine from procedure A and 31.85 grams of distilled water were added. The resulting solution was stirred with a stir bar. The resulting dispersion at room temperature is ready for application, e.g., spray-coating, onto a plastic or rubber substrate. The coating mixture has 8.5% solids in water content.

After this coating solution is applied to a polypropylene film substrate and allowed to dry, the coating contains 77.2% by weight polyester, 18.9% by weight filler, 3.0% COATOSIL 1300 wetting agent, 0.5% by weight ACUSOL® 880, 0.5% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m² day @ 1 atmosphere, 0% RH, 23° C. (lower limit of this module). Permeability of the 19.0 micron polyester nanocomposite is <0.0038 cc mm/m² day atmosphere @ 0% RH, 23° C. The reduction in permeability of this coating is >710 times the reduction in permeability of the unfilled polyester latex.

Example 14

Polyester Nanocomposite

18% NH$_4$OH/3 Day Filler Pre-Treatment

An aqueous barrier coating solution according to this invention is prepared as follows, in which the matrix is polyester (Eastman, WD-30, 30%) and the filler is MICROLITE® exfoliated silicate. The filler was treated in this example with 18% ammonium hydroxide for 3 days following treated filler procedure A.

In an 8 oz jar, 1.1 grams of ACUSOL® 880 (35.2%, Rohm & Haas), 2.28 grams of ACUSOL® 882 (17.1%, Rohm & Haas) and 13.15 grams of distilled water were weighed. A stir bar was added and the solution was stirred slowly overnight. To this solution was added a mixture of 51.09 grams of polyester latex (Eastman WD-30), 1.5 grams of COATOSIL 1300 (OSI), 4 drops of FOAMASTER VL (Cognis) and 29.38 grams of distilled water. The resulting solution was mixed thoroughly.

To the above solution, 75 grams of treated filler with 18% ammonium hydroxide from procedure A and 3 grams of distilled water were added. The resulting solution was stirred with a stir bar. The resulting dispersion at room temperature is ready for application, e.g., spray-coating, onto a plastic or rubber substrate. The coating mixture has 11.7% solids in water content.

After this coating solution is applied to a polypropylene film substrate and allowed to dry, the coating contains 74.9% by weight polyester, 19.1% by weight filler, 2.2% COATOSIL 1300 wetting agent, 1.9% by weight ACUSOL® 880, 1.9% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m² day @ 1 atmosphere, 0% RH, 23° C. (lower limit of this module). Permeability of the 35.0 micron polyester nanocomposite is <0.007 cc mm/m² day atmosphere @ 0% RH, 23° C. The reduction in permeability of this coating is >400 times the reduction in permeability of the unfilled polyester latex.

Example 15

Polyester Nanocomposite

18% NH$_4$OH/30 Minute Filler Pre-Treatment

An aqueous barrier coating solution according to this invention is prepared as follows, in which the matrix is polyester (Eastman, WD-30, 30%) and the filler is MICROLITE® exfoliated silicate. The filler was treated in this example with 18% ammonium hydroxide for 30 minutes following treated filler procedure A.

In an 8 oz jar, 0.937 grams of ACUSOL® 880 (35.2%, Rohm & Haas), 1.93 grams of ACUSOL® 882 (17.1%, Rohm & Haas) and 18.29 grams of distilled water were weighed. A stir bar was added and the solution was stirred slowly overnight. To this solution was added a mixture of 43.24 grams of polyester latex (Eastman WD-30), 1.5 grams of COATOSIL 1301 (OSI), 4 drops of FOAMASTER VL (Cognis) and 6.09 grams of distilled water. The resulting solution was mixed thoroughly.

To the above solution, 63.46 grams of treated filler with 18% ammonium hydroxide from procedure A and 14.54 grams of distilled water were added. The resulting solution was stirred with a stir bar. The resulting dispersion at room temperature is ready for application, e.g., spray-coating, onto a plastic or rubber substrate. The coating mixture has 11.6% solids in water content.

After this coating solution is applied to a polypropylene film substrate and allowed to dry, the coating contains 74.6% by weight polyester, 19.0% by weight filler, 2.6% COATOSIL 1301 wetting agent, 1.9% by weight ACUSOL® 880, 1.9% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m² day @ 1 atmosphere, 0% RH, 23° C. (lower limit of this module). Permeability of the 16.7 micron polyester nanocomposite is <0.0033 cc mm/m² day atmosphere @ 0% RH, 23° C. The reduction in permeability of this coating is >818 times the reduction in permeability of the unfilled polyester latex.

Example 16

Polyester Nanocomposite

2% NaOH/1 Day Filler Pre-Treatment

An aqueous barrier coating solution according to this invention is prepared as follows, in which the matrix is polyester (Eastman, WD-30, 30%) and the filler is MICROLITE® exfoliated silicate. The filler was treated in this example with 2% sodium hydroxide for 1 day following treated filler procedure B.

In an 8 oz jar, 0.32 grams of ACUSOL® 880 (35.2%, Rohm & Haas), 0.70 grams of ACUSOL® 882 (17.1%, Rohm & Haas) and 28.1 grams of distilled water were weighed. A stir bar was added and the solution was stirred slowly overnight. To this solution was added a mixture of 32.28 grams of polyester latex (Eastman WD-30), 1.2 grams of COATOSIL 1301 (OSI), 4 drops of FOAMASTER VL (Cognis) and 9.36 grams of distilled water. The resulting solution was mixed thoroughly.

To the above solution, 46.15 grams of treated filler with 2% sodium hydroxide from procedure B and 31.85 grams of distilled water were added. The resulting solution was stirred with a stir bar. The resulting dispersion at room temperature is ready for application, e.g., spray-coating, onto a plastic or rubber substrate. The coating mixture has 8.5% solids in water content.

After this coating solution is applied to a polypropylene film substrate and allowed to dry, the coating contains 76.4% by weight polyester, 18.9% by weight filler, 2.8% COATOSIL 1301 wetting agent, 0.9% by weight ACUSOL® 880, 0.9% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m² day @ 1 atmosphere, 0% RH, 23° C. (lower limit of this module). Permeability of the 26.4 micron polyester nanocomposite is <0.0053 cc mm/m² day atmosphere @ 0% RH, 23° C. The reduction in permeability of this coating is >509 times the reduction in permeability of the unfilled polyester latex.

Example 17

Polyester Nanocomposite

2% NaOH/2 Day Filler Pre-Treatment

An aqueous barrier coating solution according to this invention is prepared as follows, in which the matrix is polyester (Eastman, WD-30, 30%) and the filler is MICROLITE® exfoliated silicate. The filler was treated in this example with 2% sodium hydroxide for 2 day following treated filler procedure B.

In an 8 oz jar, 0.32 grams of ACUSOL® 880 (35.2%, Rohm & Haas), 0.70 grams of ACUSOL® 882 (17.1%, Rohm & Haas) and 28.1 grams of distilled water were weighed. A stir bar was added and the solution was stirred slowly overnight. To this solution was added a mixture of 32.28 grams of polyester latex (Eastman WD-30), 1.2 grams of COATOSIL 1301 (OSI), 4 drops of FOAMASTER VL (Cognis) and 9.36 grams of distilled water. The resulting solution was mixed thoroughly.

To the above solution, 46.15 grams of treated filler with 2% sodium hydroxide from procedure B and 31.85 grams of distilled water were added. The resulting solution was stirred with a stir bar. The resulting dispersion at room temperature is ready for application, e.g., spray-coating, onto a plastic or rubber substrate. The coating mixture has 8.5% solids in water content.

After this coating solution is applied to a polypropylene film substrate and allowed to dry, the coating contains 76.4% by weight polyester, 18.9% by weight filler, 2.8% COATOSIL 1301 wetting agent, 0.9% by weight ACUSOL® 880, 0.9% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m$^2$ day @ 1 atmosphere, 0% RH, 23° C. (lower limit of this module). Permeability of the 11.9 micron polyester nanocomposite is <0.0024 cc mm/m$^2$ day atmosphere @ 0% RH, 23° C. The reduction in permeability of this coating is >1125 times the reduction in permeability of the unfilled polyester latex.

Example 18

Polyester Nanocomposite

2% KOH/30 Minute Filler Pre-Treatment

An aqueous barrier coating solution according to this invention is prepared as follows, in which the matrix is polyester (Eastman, WD-30, 30%) and the filler is MICROLITE® exfoliated silicate. The filler was treated in this example with 2% potassium hydroxide for 30 minutes following treated filler procedure B. In an 8 oz jar, 0.85 grams of ACUSOL®D 880 (35.2%, Rohm & Haas), 1.75 grams of ACUSOL® 882 (17.1%, Rohm & Haas) and 21.64 grams of distilled water were weighed. A stir bar was added and the solution was stirred slowly overnight. To this solution was added a mixture of 39.3 grams of polyester latex (Eastman WD-30), 1.25 grams of COATOSIL 1301 (OSI), 4 drops of FOAMASTER VL (Cognis) and 7.21 grams of distilled water. The resulting solution was mixed thoroughly.

To the above solution, 57.69 grams of treated filler with 2% potassium hydroxide from procedure B and 20.31 grams of distilled water were added. The resulting solution was stirred with a stir bar. The resulting dispersion at room temperature is ready for application, e.g., spray-coating, onto a plastic or rubber substrate. The coating mixture has 10.5% solids in water content.

After this coating solution is applied to a polypropylene film substrate and allowed to dry, the coating contains 74.8% by weight polyester, 19.0% by weight filler, 2.4% COATOSIL 1301 wetting agent, 1.9% by weight ACUSOL® 880, 1.9% by weight ACUSOL® 882 and 0.1% by weight FOAMASTER VL anti-foaming agent.

The oxygen transmission rate (OTR) is measured using a Mocon OX-TRAN 2/20 module. The OTR is 1.51 cc/m$^2$ day @ 1 atmosphere, 0% RH, 23° C. Permeability of the 15.4 micron polyester nanocomposite is 0.0233 cc mm/m$^2$ day atmosphere @ 0% RH, 23° C. The reduction in permeability of this coating is >120 times the reduction in permeability of the unfilled polyester latex.

Example 19

Polyester Nanocomposite

2% KOH/1 Day Filler Pre-Treatment

An aqueous barrier coating solution according to this invention is prepared as follows, in which the matrix is polyester (Eastman, WD-30, 30%) and the filler is MICROLITE® exfoliated silicate. The filler was treated in this example with 2% potassium hydroxide for 1 day following treated filler procedure B. In an 8 oz jar, 0.32 grams of ACUSOL® 880 (35.2%, Rohm & Haas), 0.70 grams of ACUSOL® 882 (17.1%, Rohm & Haas) and 28.1 grams of distilled water were weighed. A stir bar was added and the solution was stirred slowly overnight. To this solution was added a mixture of 32.28 grams of polyester latex (Eastman WD-30), 1.2 grams of COATOSIL 1301 (OSI), 4 drops of FOAMASTER VL (Cognis) and 9.36 grams of distilled water. The resulting solution was mixed thoroughly.

To the above solution, 46.15 grams of treated filler with 2% potassium hydroxide from procedure B and 31.85 grams of distilled water were added. The resulting solution was stirred with a stir bar. The resulting dispersion at room temperature is ready for application, e.g., spray-coating, onto a plastic or rubber substrate. The coating mixture has 8.5% solids in water content.

After this coating solution is applied to a polypropylene film substrate and allowed to dry, the coating contains 76.4% by weight polyester, 18.9% by weight filler, 2.8% COATOSIL 1301 wetting agent, 0.9% by weight ACUSOL® 880, 0.9% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m$^2$ day @ 1 atmosphere, 0% RH, 23° C. (lower limit of this module). Permeability of the 20.8 micron polyester nanocomposite is <0.0042 cc mm/m$^2$ day atmosphere @ 0% RH, 23° C. The reduction in permeability of this coating is >643 times the reduction in permeability of the unfilled polyester latex.

Example 20

Polyester Nanocomposite

2% KOH/2 Day Filler Pre-Treatment

An aqueous barrier coating solution according to this invention is prepared as follows, in which the matrix is polyester (Eastman, WD-30, 30%) and the filler is MICROLITE® exfoliated silicate. The filler was treated in this example with 2% potassium hydroxide for 2 days following treated filler procedure B.

In an 8 oz jar, 0.32 grams of ACUSOL® 880 (35.2%, Rohm & Haas), 0.70 grams of ACUSOL® 882 (17.1%, Rohm & Haas) and 28.1 grams of distilled water were weighed. A stir bar was added and the solution was stirred slowly overnight. To this solution was added a mixture of 32.28 grams of polyester latex (Eastman WD-30), 1.2 grams of COATOSIL 1301 (OSI), 4 drops of FOAMASTER VL (Cognis) and 9.36 grams of distilled water. The resulting solution was mixed thoroughly.

To the above solution, 46.15 grams of treated filler with 2% potassium hydroxide from procedure B and 31.85 grams of distilled water were added. The resulting solution was stirred with a stir bar. The resulting dispersion at room temperature is ready for application, e.g., spray-coating, onto a plastic or rubber substrate. The coating mixture has 8.5% solids in water content.

After this coating solution is applied to a polypropylene film substrate and allowed to dry, the coating contains 76.4% by weight polyester, 18.9% by weight filler, 2.8% COATO-SIL 1301 wetting agent, 0.9% by weight ACUSOL® 880, 0.9% by weight ACUSOL® 882 and 0.1% by weight FOAMASTER VL anti-foaming agent.

The oxygen transmission rate (OTR) is measured using a Mocon OX-TRAN 2/20 module. The OTR is <0.2 cc/m$^2$ day @ 1 atmosphere, 0% RH, 23° C. (lower limit of this module). Permeability of the 9.1 micron polyester nanocomposite is <0.0018 cc mm/m$^2$ day atmosphere @ 0% RH, 23° C. The reduction in permeability of this coating is >1500 times the reduction in permeability of the unfilled polyester latex.

A summary of the data obtained in Examples 10-20 is listed in Table 2.

Polyester can be combined with filler that has been pretreated with either acid or base. As can be seen from the data in Table 2, large reductions in permeability are again achieved, over untreated filler, utilizing fillers pre-treated with acid or base. In this case, the acid is represented by glycine and the bases are chosen from ammonium hydroxide, sodium hydroxide or potassium hydroxide. Moreover, these reductions in permeability can be realized for filler treatments ranging from as little as 2% by weight up to greater than 18% by weight of acid or base for periods ranging from 30 minutes to 3 days. In some of the cases shown, the reduction in OTR exceeds the lower limits of sensitivity of the measuring apparatus (See Examples 13-17 and 19-20).

TABLE 2

POLYESTER NANOCOMPOSITES

| | Treatment[1] | Permeability[2] | Reduction in Permeability[3] | Example # |
|---|---|---|---|---|
| Unfilled | n/a | 2.8 | n/a | 10 |
| Untreated | n/a | 0.03 | 90 | 11 |
| Treated | 18% Glycine, 3 day | 0.0037 | 756 | 12 |
| Treated | 18% Glycine, 30 min | <0.0038 | >710 | 13 |
| Treated | 18% NH$_4$OH, 3 day | <0.0070 | >400 | 14 |
| Treated | 18% NH$_4$OH, 30 min | <0.0033 | >818 | 15 |
| Treated | 2% NaOH, 1 day | <0.0053 | >509 | 16 |
| Treated | 2% NaOH, 2 day | <0.0024 | >1125 | 17 |

TABLE 2-continued

POLYESTER NANOCOMPOSITES

| | Treatment[1] | Permeability[2] | Reduction in Permeability[3] | Example # |
|---|---|---|---|---|
| Treated | 2% KOH, 30 min | 0.0233 | 120 | 18 |
| Treated | 2% KOH, 1 day | <0.0042 | >643 | 19 |
| Treated | 2% KOH, 2 day | <0.0018 | >1500 | 20 |

Notes:
[1]The filler treatment is detailed in the examples.
[2]Permeability is oxygen permeability and reported in units of cc mm/m$^2$ day atm @ 23° C., 0% relative humidity.
[3]Reduction in permeability is reduction of the oxygen permeability of the nanocomposite relative to the oxygen permeability of the unfilled polymer reported in times reduction.

Alternative Embodiments

There is provided in a first alternative embodiment (Alternative Embodiment No. 1) a coating dispersion containing a non-elastomeric polymer, a substantially exfoliated silicate filler material not functionalized with organic cations, the silicate having an aspect ratio greater than 25 and the silicate is present at less than 60% of the total solids content; and at least one additive, selected from the group consisting of surfactants, emulsifiers, anti-foaming agents, dispersing agents, wetting agents, leveling agents and thickeners wherein the total solids content is less than 30% of the dispersion and wherein the dispersion provides a coating with an at least 5-fold greater reduction in permeability than a coating formed of the unfilled non-elastomeric polymer alone.

The coating suspension can be in a form of a dispersion, an emulsion, a suspension and a latex.

The non-elastomeric polymer is selected from the group consisting of polyesters, polyamides, chlorinated polymers, polyolefins, polyurethanes, polyethers, polycarbonates, polyketones, acrylics, vinylics and fluoropolymers. Preferably the non-elastomeric polymer is selected from polyvinylidene chloride and its copolymers and blends, polyester containing polymers, and polyesters, preferably where the polyester has a $T_g$ lower than 70° C., preferably lower than 35° C.

The non-elastomeric polymer is present in the suspension at between about 40% to about 95% by weight of total solids.

The silicate is selected from the group consisting of bentonite, vermiculite, montmorillonite, nontronite, beidellite, volkonskoite, hectorite, saponite, laponite, sauconite, magadiite, kenyaite, ledikite and mixtures and solutions of the above silicates. The preferred silicate is vermiculite and is present at less than 60% of the total solids, preferably from 5 to about 50%.

The silicate filler can be treated with acid or base prior to mixing with said non-elastomeric polymer. The acid is chosen from acetic acid, glycine and citric acid and the base is selected from ammonium hydroxide, sodium hydroxide and potassium hydroxide.

The coating suspension has a total solids content of from about 1 to about 30% of the dispersion, preferably from about 5 to about 25% of the dispersion.

The coating suspension can also contain a component selected from the group consisting of water, hexane, heptane, toluene, isopropyl alcohol, cyclohexanone, ethanol, methanol, other hydrocarbons, and combinations thereof.

Alternative Embodiment No. 2 is a method of producing a coating dispersion comprising mixing an aqueous dispersion of a non-elastomeric polymer, a substantially exfoliated silicate filler material not functionalized with organic cations, the silicate having an aspect ratio greater than 25 and the silicate is present at less than 60% of the total solids content and at least one additive, selected from the group consisting of surfactants, emulsifiers, anti-foaming agents, dispersing agents, wetting agents, leveling agents and thickeners, wherein the total solids content is less than 30% of the dispersion and wherein the dispersion provides a coating with an at least 5-fold greater reduction in permeability than a coating formed of the unfilled non-elastomeric polymer alone.

The coating suspension can be in a form of a dispersion, an emulsion, a suspension and a latex.

The non-elastomeric polymer is selected from the group consisting of polyesters, polyamides, chlorinated polymers, polyolefins, polyurethanes, polyethers, polycarbonates, polyketones, acrylics, vinylics and fluoropolymers. Preferably the non-elastomeric polymer is selected from polyvinylidene chloride and its copolymers and blends, polyester containing polymers, and polyesters, preferably where the polyester has a $T_g$ lower than 70° C., preferably lower than 35° C.

The non-elastomeric polymer is present in the suspension at between about 40% to about 95% by weight of total solids.

The silicate is selected from the group consisting of bentonite, vermiculite, montmorillonite, nontronite, beidellite, volkonskoite, hectorite, saponite, laponite, sauconite, magadiite, kenyaite, ledikite and mixtures and solutions of the above silicates. The preferred silicate is vermiculite and is present at less than 60% of the total solids, preferably from 5 to about 50%.

The silicate filler can be treated with acid or base prior to mixing with said non-elastomeric polymer. The acid is chosen from acetic acid, glycine and citric acid and the base is selected from ammonium hydroxide, sodium hydroxide and potassium hydroxide.

The coating suspension has a total solids content of from about 1 to about 30% of the dispersion, preferably from about 5 to about 25% of the dispersion.

The coating suspension can also contain a component selected from the group consisting of water, hexane, heptane, toluene, isopropyl alcohol, cyclohexanone, ethanol, methanol, other hydrocarbons, and combinations thereof.

Alternative Embodiment No. 3 is a coated article, which has on at least one surface or interface thereof, a dried barrier coating produced from application of the barrier coating mixture as described above. The coating on the article reduces the gas permeation rate of said article by having a permeability that is at least 5-fold greater reduction in permeability than a coating formed of the unfilled non-elastomeric polymer alone.

Alternative Embodiment No. 4 is a coating suspension for producing a barrier coating comprising about 65% to about 95% by weight of a non-elastomeric polymer, between 5% to about 35% by weight of a silicate and between about 0.1% to about 15% by weight of an additive, the silicate in the coating suspension having an aspect ratio greater than 25.

While the invention has been described in connection with several embodiments, modifications of those embodiments within the spirit and scope of the present invention will be readily apparent to those of skill in the art. The invention is defined in the appended claims.

What is claimed is:

1. A barrier coating derived from a stable aqueous dispersion where said dispersion is in the form of an emulsion, suspension, colloidal dispersion and/or latex, said dispersion including (i) a dispersed non-elastomeric polymer selected from the group consisting of polyvinylidene chlorides, polyesters, polyacrylics and polyurethanes, (ii) a dispersed substantially exfoliated silicate filler material not functionalized with organic cations, the silicate filler having an aspect ratio greater than 25 wherein said substantially exfoliated silicate filler is treated with acid or base prior to being combined with the non-elastomeric polymer, and wherein % of the silicate filler is less than 60% of the solid content based on weight, and (iii) at least one additive, selected from the group consisting of surfactants, emulsifiers, anti-foaming agents, dispersing agents, wetting agents, leveling agents and thickeners wherein the coating exhibits an at least 5-fold reduction in gas permeability than a coating formed of said non-elastomeric polymer alone.

2. The barrier coating according to claim 1 wherein said coating exhibits an at least 25-fold reduction in gas permeability as compared with a coating formed of said non-elastomeric polymer alone.

3. The barrier coating according to claim 2 wherein said coating exhibits an at least 50-fold reduction in gas permeability as compared with a coating formed of said non-elastomeric polymer alone.

4. The barrier coating according to claim 3 wherein said coating exhibits an at least 100-fold reduction in gas permeability as compared with a coating formed of said non-elastomeric polymer alone.

5. The barrier coating according to claim 4 wherein said coating exhibits an at least 500-fold reduction in gas permeability as compared with a coating formed of said non-elastomeric polymer alone.

6. The barrier coating according to claim 5 wherein said coating exhibits an at least 1000-fold reduction in gas permeability as compared with a coating formed of said non-elastomeric polymer alone.

7. The barrier coating according to claim 1 wherein said non-elastomeric polymer is a polyvinylidene chloride containing polymer.

8. The barrier coating according to claim 7 wherein said non-elastomeric polymer is a polyvinylidene chloride/polyvinyl chloride copolymer.

9. The barrier coating according to claim 1 wherein said non-elastomeric polymer is a polyester with a $T_g$ lower than 70° C.

10. The barrier coating according to claim 9 wherein said non-elastomeric polymer is a polyester with a $T_g$ lower than 35° C.

11. The barrier coating according to claim 1 wherein said silicate filler is selected from the group consisting of bentonite, vermiculite, montmorillonite, nontronite, beidellite, volkonskoite, hectorite, saponite, laponite, sauconite, magadiite, kenyaite, ledikite and mixtures or solutions of the above silicates.

12. The barrier coating of claim 11 wherein said silicate filler is vermiculite.

13. The barrier coating of claim 1 wherein said acid is selected from the group consisting of acetic acid, glycine and citric acid.

14. The barrier coating of claim 1 wherein said base is selected from the group consisting of ammonium hydroxide, sodium hydroxide and potassium hydroxide.

15. The barrier coating according to claim 1 wherein said silicate filler is present in said dispersion at between 10 to about 50% of the total solids content of the dispersion, based on weight.

16. The barrier coating according to claim 1 wherein said dispersion has a total solids content of from about 5 to about 25%, based on weight.

17. A method to produce a barrier coating film comprising:
   a) applying to a substrate an aqueous dispersion containing a dispersed non-elastomeric polymer selected from the group consisting of polyvinylidene chlorides, polyesters, polyacrylics and polyurethanes, a dispersed substantially exfoliated silicate filler material not functionalized with organic cations, the silicate filler having an aspect ratio greater than 25, wherein said substantially exfoliated silicate filler is treated with acid or base prior to being combined with the non-elastomeric polymer, wherein % of the silicate is less than 60% of the solid content based on weight, and at least one additive, selected from the group consisting of surfactants, emulsifiers, anti-foaming agents, dispersing agents, wetting agents, leveling agents and thickeners;
   b) drying the dispersion to a barrier coating having the same polymer to filler ratio as in said dispersion wherein the coating exhibits an at least 5-fold reduction in gas permeability than a coating formed of said non-elastomeric polymer alone.

18. The method according to claim 17 wherein said dispersion is in a form selected from the group consisting of a dispersion, an emulsion, a suspension and a latex.

19. The method according to claim 17 wherein said non-elastomeric polymer is a polyvinylidene chloride containing polymer.

20. The barrier coating according to claim 19 wherein said non-elastomeric polymer is a polyvinylidene chloride/polyvinyl chloride copolymer.

21. The method according to claim 17 wherein said non-elastomeric polymer is a polyester with a $T_g$ lower than 70° C.

22. The method according to claim 21 wherein said non-elastomeric polymer is a polyester with a $T_g$ lower than 35° C.

23. The method according to claim 17 wherein said silicate filler is selected from the group consisting of bentonite, vermiculite, montmorillonite, nontronite, beidellite, volkonskoite, hectorite, saponite, laponite, sauconite, magadiite, kenyaite, ledikite and mixtures of the above silicates.

24. The method of claim 23 wherein said silicate filler is vermiculite.

25. The method of claim 17 wherein said acid is selected from the group consisting of acetic acid, glycine and citric acid.

26. The method of claim 17 wherein said base is selected from the group consisting of ammonium hydroxide, sodium hydroxide and potassium hydroxide.

27. The method according to claim 17 wherein said dispersed silicate is present in said dispersion at between 10 to about 50% of the total solids content, based on weight.

28. The method according to claim 17 wherein said dispersion has a total solids content of from about 5 to about 25%, based on weight.

29. The method according to claim 17 wherein said substrate is selected from the group consisting of antiseptic packaging films, corrosion protective films, vacuum and controlled atmosphere packages, blow molded containers, thermoformed containers and electronic display films.

30. A barrier coating derived from a mixture of:
   a) an aqueous dispersed non-elastomeric polymer selected from the group consisting of polyvinylidene chlorides, polyesters, polyacrylics and polyurethanes; and
   b) an aqueous dispersed, exfoliated silicate filler having an aspect ratio greater than 25, wherein the aqueous dispersed, exfoliated silicate filler is treated with acid or base prior to being mixed with the dispersed, non-elastomeric polymer;

wherein the mixture further includes at least one additive, selected from the group consisting of surfactants, emulsifiers, anti-foaming agents, dispersing agents, leveling agents and thickeners,
and wherein the coating exhibits an at least 100-fold reduction in gas permeability than a coating formed of said non-elastomeric polymer alone.

31. A barrier coating derived from a stable aqueous coating formulation which is in the form of an emulsion, a suspension, a latex, a colloidal dispersion, or combinations thereof, and wherein the formulation includes:
   a) a dispersed non-elastomeric polymer selected from the group consisting of polyvinylidene chlorides, polyesters, polyacrylics and polyurethanes;
   b) a dispersed exfoliated silicate filler having an aspect ratio greater than 25, wherein the aqueous dispersed, exfoliated silicate filler, is treated with acid or base prior to being mixed with the dispersed, non-elastomeric polymer; and
   c) at least one additive selected from the group consisting of surfactants, emulsifiers, anti-foaming agents, dispersing agents, leveling agents, and thickeners,
wherein further the coating exhibits an at least 500-fold reduction in gas permeability than a coating formed of said non-elastomeric polymer alone.

32. A barrier coating derived from a stable aqueous dispersion where said dispersion is in the form of an emulsion, suspension, colloidal dispersion and/or latex, said dispersion including (i) a dispersed non-elastomeric polymer selected from the group consisting of polyvinylidene chlorides, polyesters, polyacrylics and polyurethanes, (ii) a dispersed substantially exfoliated silicate filler material not functionalized with organic cations, the silicate filler having an aspect ratio greater than 25 wherein said substantially exfoliated silicate filler is treated with acid or base prior to being combined with the non-elastomeric polymer, and wherein % of the silicate filler is less than 60% of the solid content based on weight, and (iii) at least one additive, selected from the group consisting of surfactants, emulsifiers, anti-foaming agents, dispersing agents, wetting agents, leveling agents and thickeners wherein the coating exhibits an at least 2-fold reduction in gas permeability as compared with a like coating formed with untreated filler.

33. The barrier coating according to claim 32 wherein said coating exhibits an at least 5-fold reduction in permeability as compared with a like coating formed with untreated filler.

34. The barrier coating according to claim 32 wherein said coating exhibits an at least 10-fold reduction in permeability as compared with a like coating formed with untreated filler.

35. A method to produce a barrier coating film comprising:
   a) applying to a substrate an aqueous dispersion containing a dispersed non-elastomeric polymer selected from the group consisting of polyvinylidene chlorides, polyesters, polyacrylics and polyurethanes, a dispersed substantially exfoliated silicate filler material not functionalized with organic cations, the silicate filler having an aspect ratio greater than 25, wherein said substantially exfoliated silicate filler is treated with acid or base prior to being combined with the non-elastomeric polymer, wherein % of the silicate is less than 60% of the solid content based on weight, and at least one additive, selected from the group consisting of surfactants, emulsifiers, anti-foaming agents, dispersing agents, wetting agents, leveling agents and thickeners;
   b) drying the dispersion to a barrier coating having the same polymer to filler ratio as in said dispersion wherein the coating exhibits an at least 2-fold reduction in gas permeability as compared with a like coating formed with untreated filler.

36. The method according to claim 35 wherein the barrier coating exhibits an at least 5-fold reduction in gas permeability as compared with a like coating formed with untreated filler.

37. The method according to claim 35 wherein the barrier coating exhibits an at least 10-fold reduction in gas permeability as compared with a like coating formed with untreated filler.

38. A barrier coating derived from a stable aqueous coating formulation which is in the form of an emulsion, a suspension, a latex, a colloidal dispersion, or combinations thereof, and wherein the formulation includes:
  a) a dispersed non-elastomeric polymer selected from the group consisting of polyvinylidene chlorides, polyesters, polyacrylics and polyurethanes;
  b) a dispersed exfoliated silicate filler having an aspect ratio greater than 25, wherein the aqueous dispersed, exfoliated silicate filler, is treated with acid or base prior to being mixed with the dispersed, non-elastomeric polymer; and
  c) at least one additive selected from the group consisting of surfactants, emulsifiers, anti-foaming agents, dispersing agents, leveling agents, and thickeners,
wherein further the coating exhibits an at least 2-fold reduction in gas permeability as compared with a like coating formed with untreated filler.

39. The barrier coating according to claim 38 wherein said coating exhibits an at least 5-fold reduction in permeability as compared with a like coating formed with untreated filler.

40. The barrier coating according to claim 38 wherein said coating exhibits an at least 10-fold reduction in permeability as compared with a like coating formed with untreated filler.

* * * * *